United States Patent

Washisu et al.

[11] Patent Number: 6,091,448
[45] Date of Patent: *Jul. 18, 2000

[54] APPARATUS FOR PREVENTING AN IMAGE BLUR PREVENTION DEVICE FROM CHANGING STATES DURING AN IMAGE RECORDING OPERATION

[75] Inventors: Koichi Washisu, Tokyo; Ichiro Onuki, Kawasaki, both of Japan

[73] Assignee: Canon Kabushiki Kaisha, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/363,009

[22] Filed: Dec. 23, 1994

[30] Foreign Application Priority Data

Dec. 27, 1993 [JP] Japan ................................ 5-333656
Dec. 28, 1993 [JP] Japan ................................ 5-349116

[51] Int. Cl.⁷ ............................................ H04N 5/228
[52] U.S. Cl. ............................................ 348/208
[58] Field of Search ....................... 348/208; H04N 5/232

[56] References Cited

U.S. PATENT DOCUMENTS

| | | | |
|---|---|---|---|
| 5,053,875 | 10/1991 | Ishii et al. | 348/208 |
| 5,479,236 | 12/1995 | Tanaka | 348/208 |
| 5,481,394 | 1/1996 | Kimura | 396/55 |
| 5,502,484 | 3/1996 | Okada | 348/208 |
| 5,517,238 | 5/1996 | Hirasawa | 348/208 |
| 5,576,787 | 11/1996 | Kai et al. | 396/55 |
| 5,587,737 | 12/1996 | Sekine et al. | 348/208 |
| 5,596,366 | 1/1997 | Takashima et al. | 348/208 |
| 5,633,756 | 5/1997 | Kaneda et al. | 396/55 |
| 5,637,860 | 6/1997 | Shiomi | 396/72 |
| 5,712,474 | 1/1998 | Naeda | 348/208 |
| 5,842,051 | 11/1998 | Kumakura | 396/55 |

FOREIGN PATENT DOCUMENTS

| | | |
|---|---|---|
| 2-181741 | 7/1990 | Japan . |
| 4-20943 | 1/1992 | Japan ................ G03B 5/00 |
| 4-95933 | 3/1993 | Japan . |
| 5-127241 | 5/1993 | Japan ............. G03B 17/00 |

*Primary Examiner*—Wendy Garber
*Assistant Examiner*—Aung S. Moe
*Attorney, Agent, or Firm*—Fitzpatrick, Cella, Harper & Scinto

[57] ABSTRACT

Apparatus for preventing an image blur prevention device from changing states during an image recording operation includes control circuitry for changing a state of the image blur prevention device between an operative state and an inoperative state in accordance with a received signal. Operation structure is provided for preventing, during an image recording operation, an abrupt image blur caused by the control circuitry changing the state of the image blur prevention device between the operative state and the inoperative state.

14 Claims, 32 Drawing Sheets

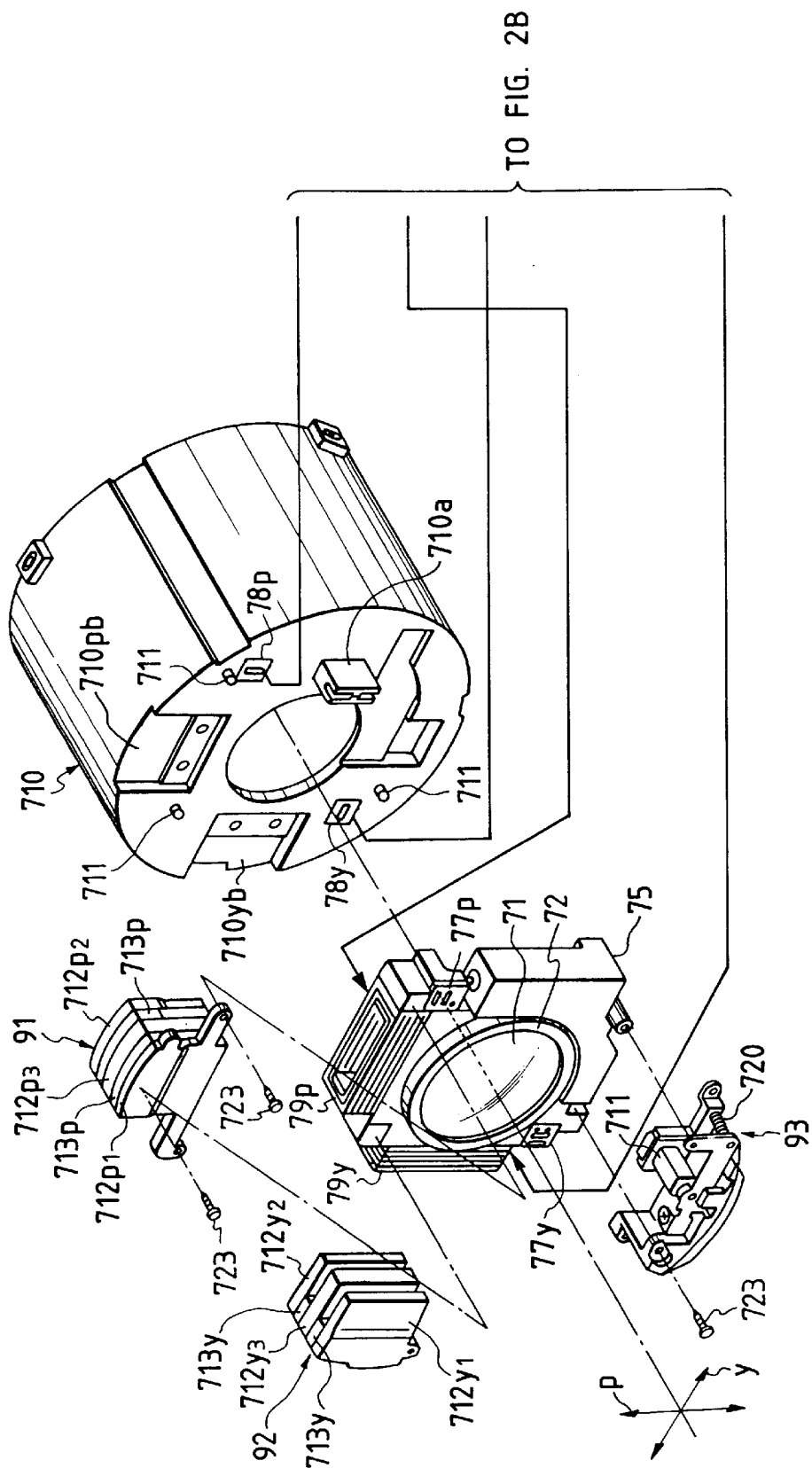

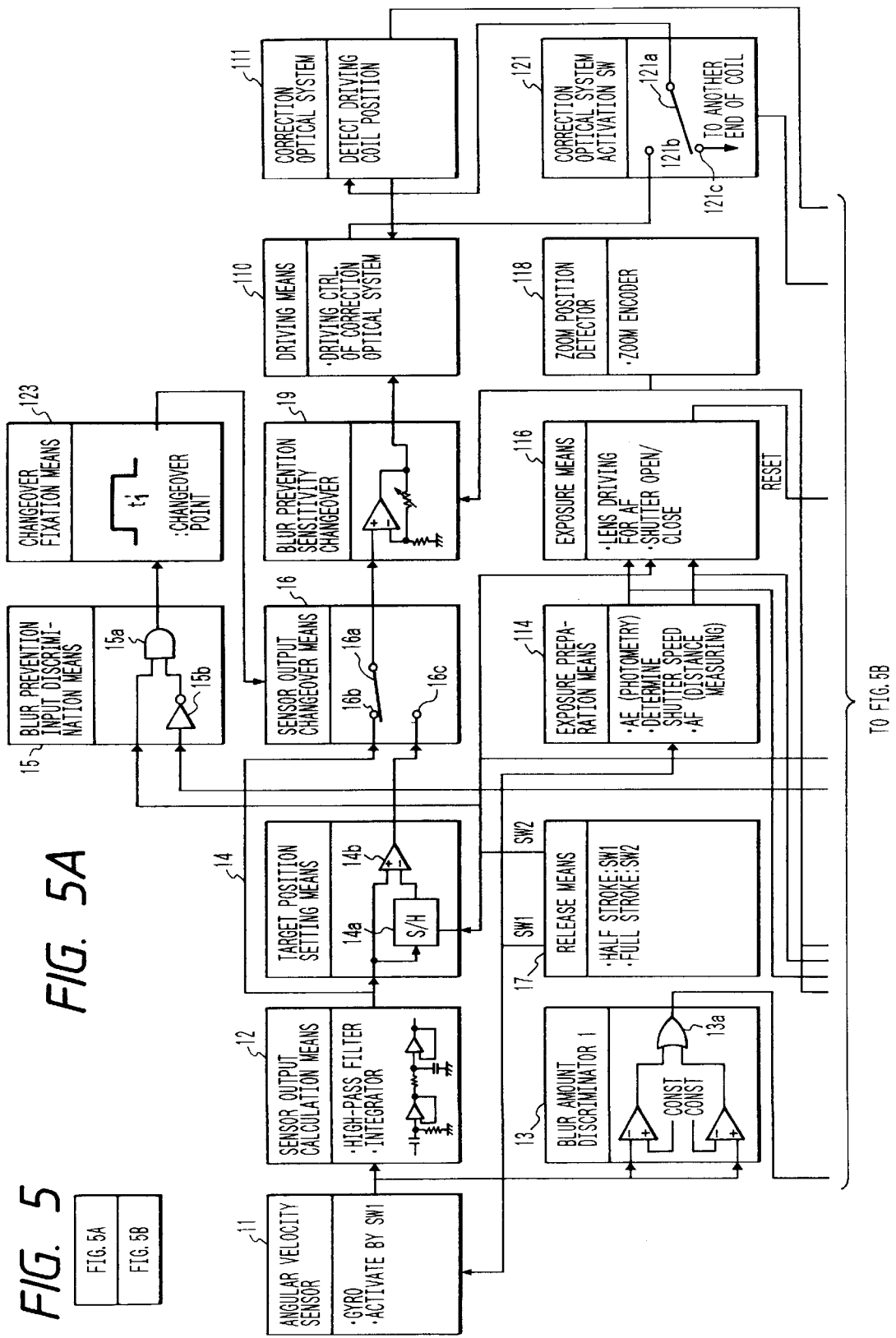

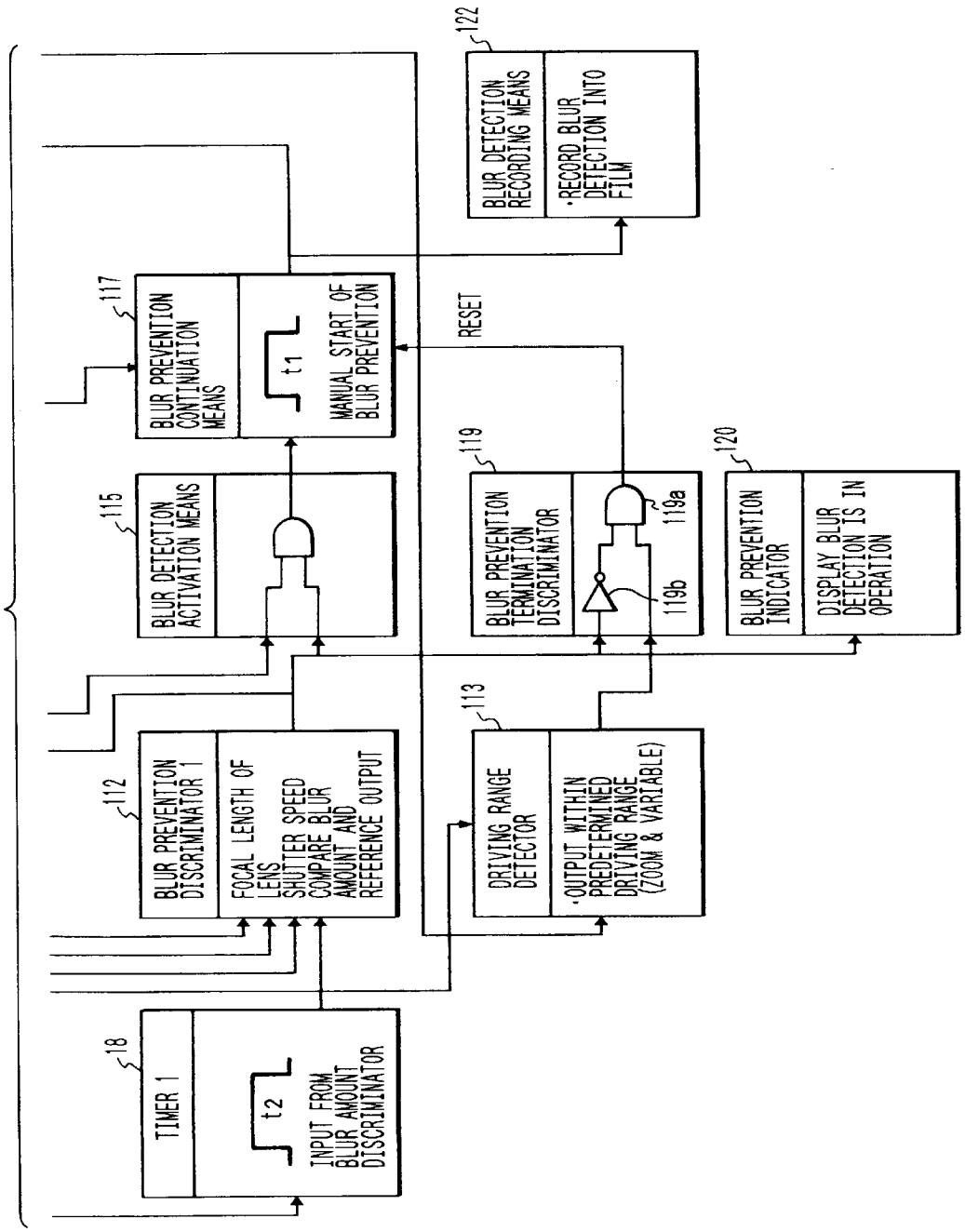

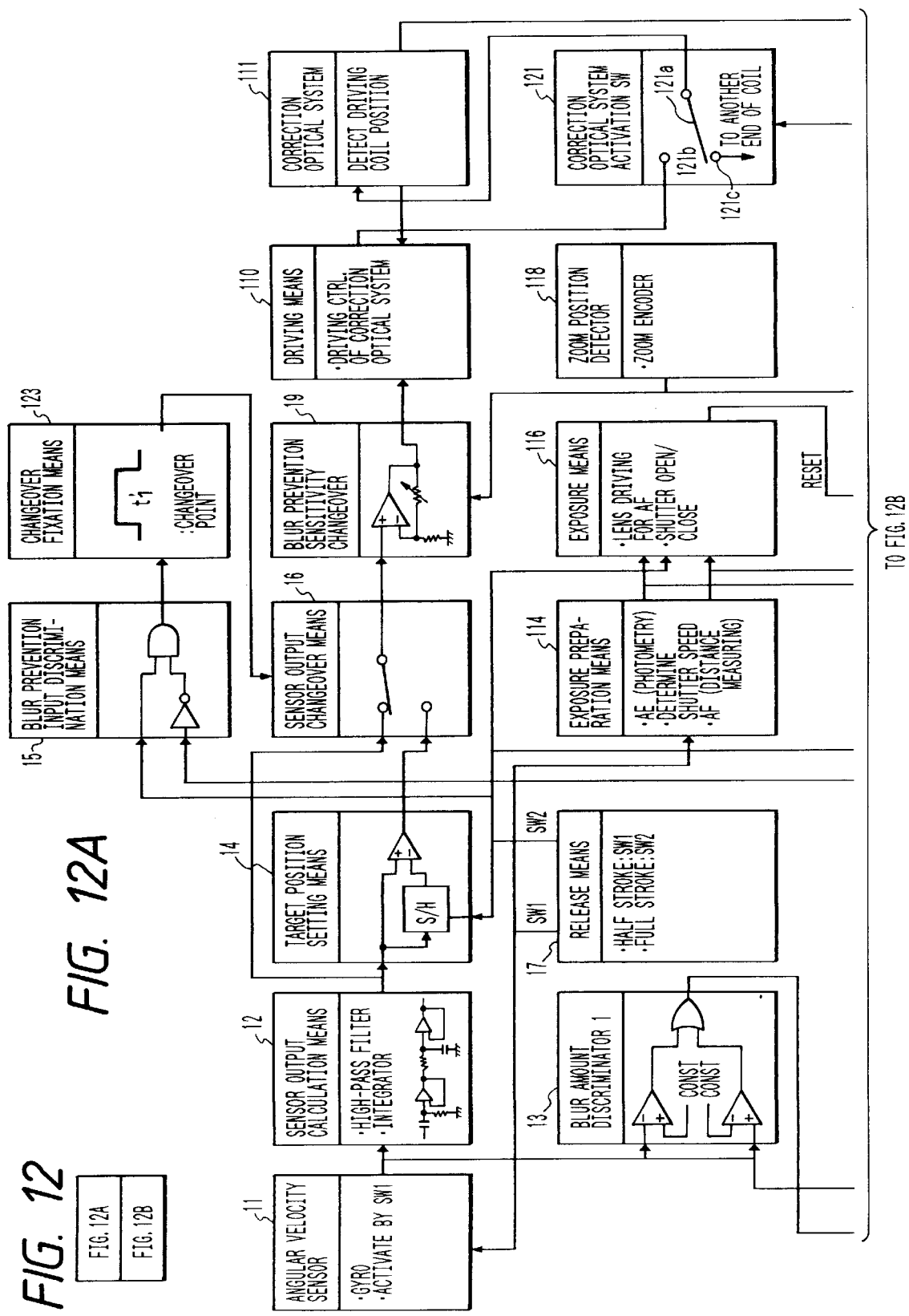

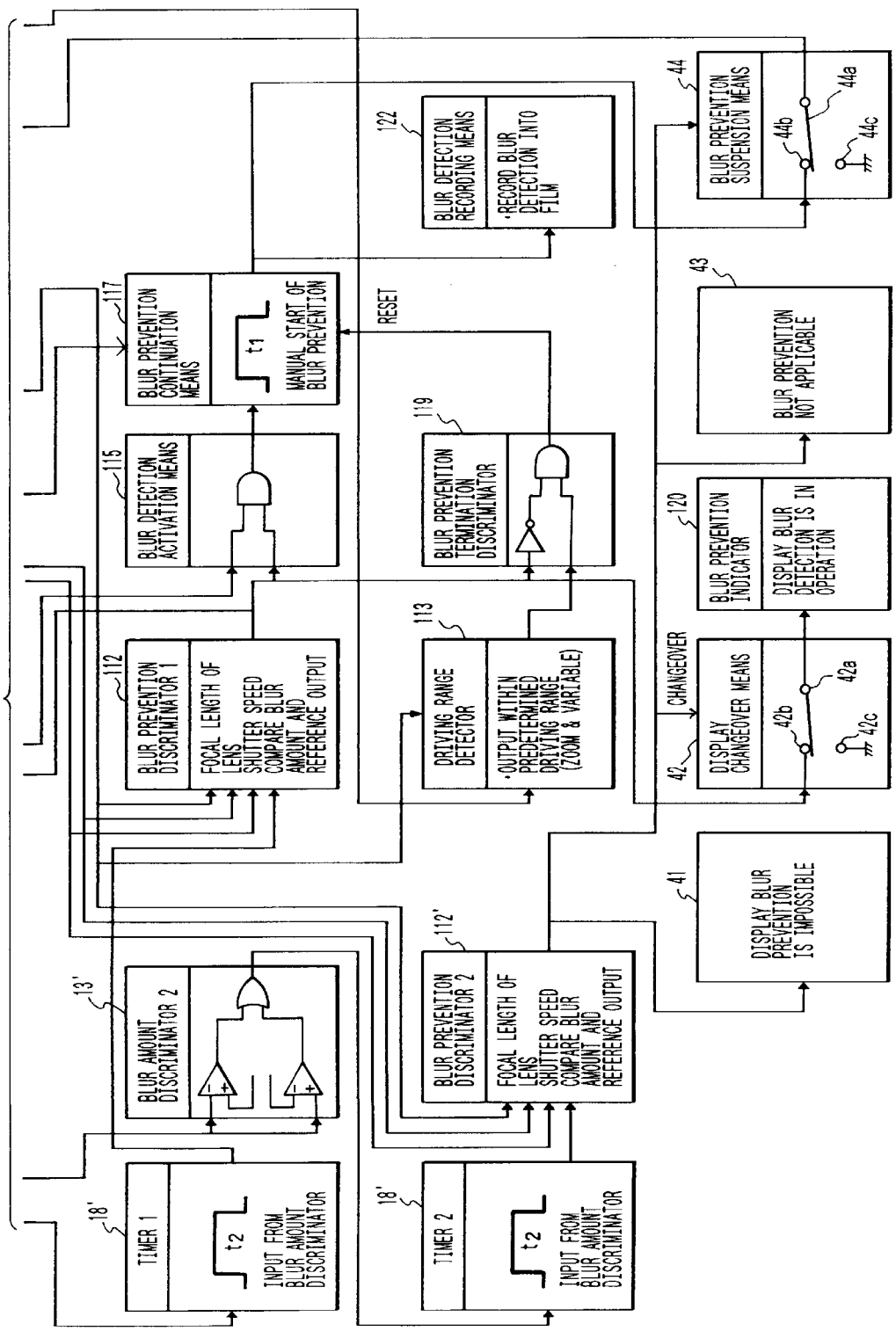

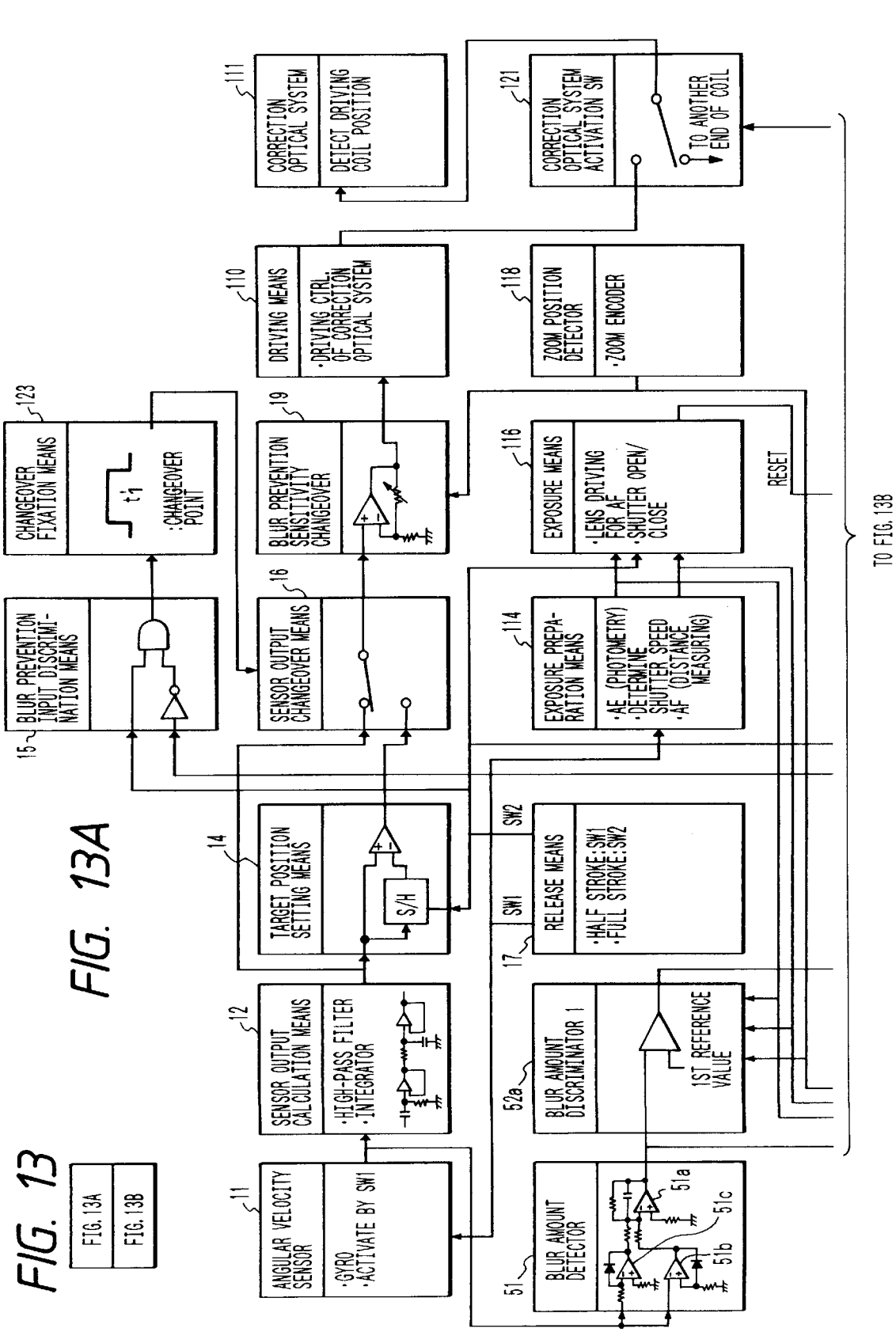

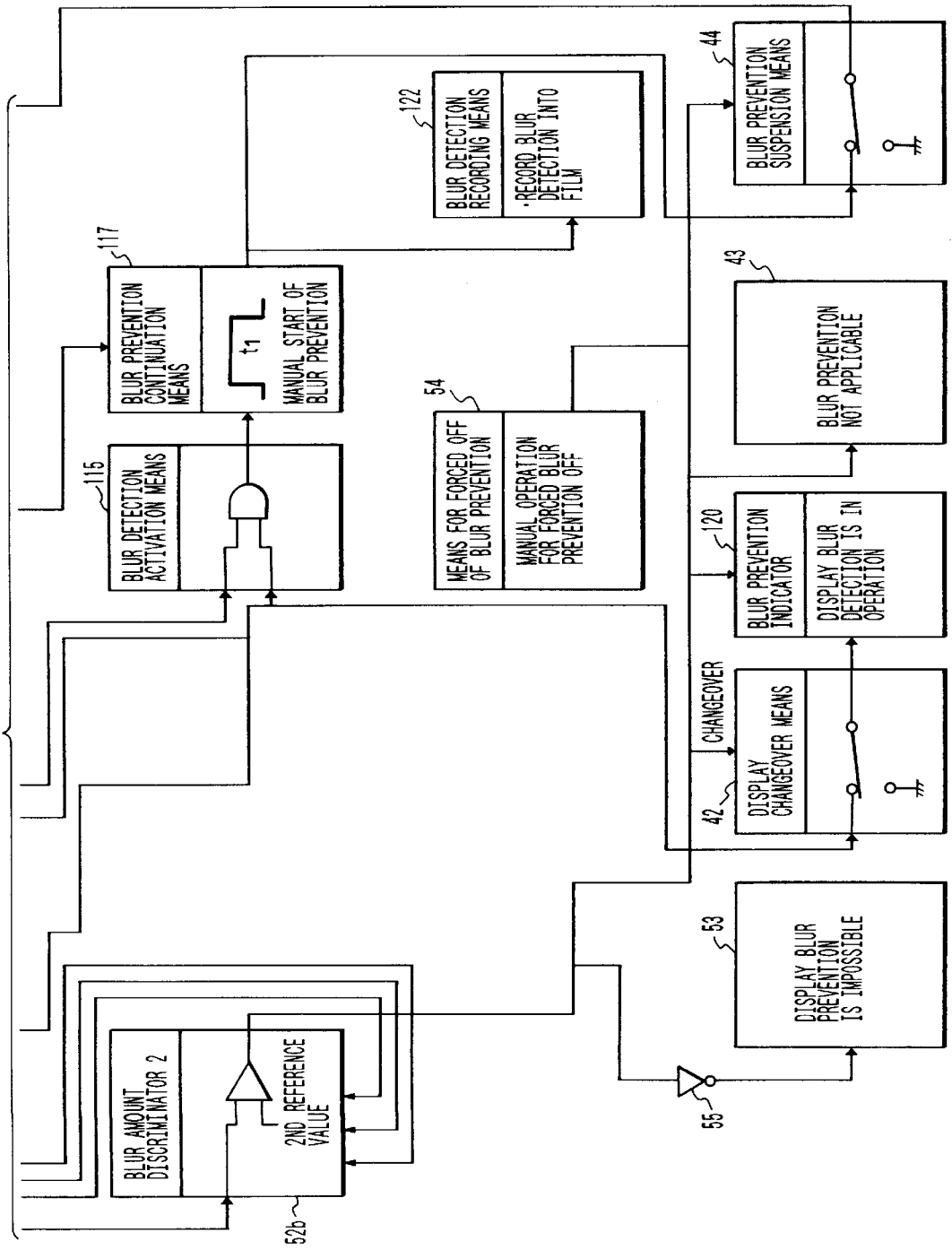

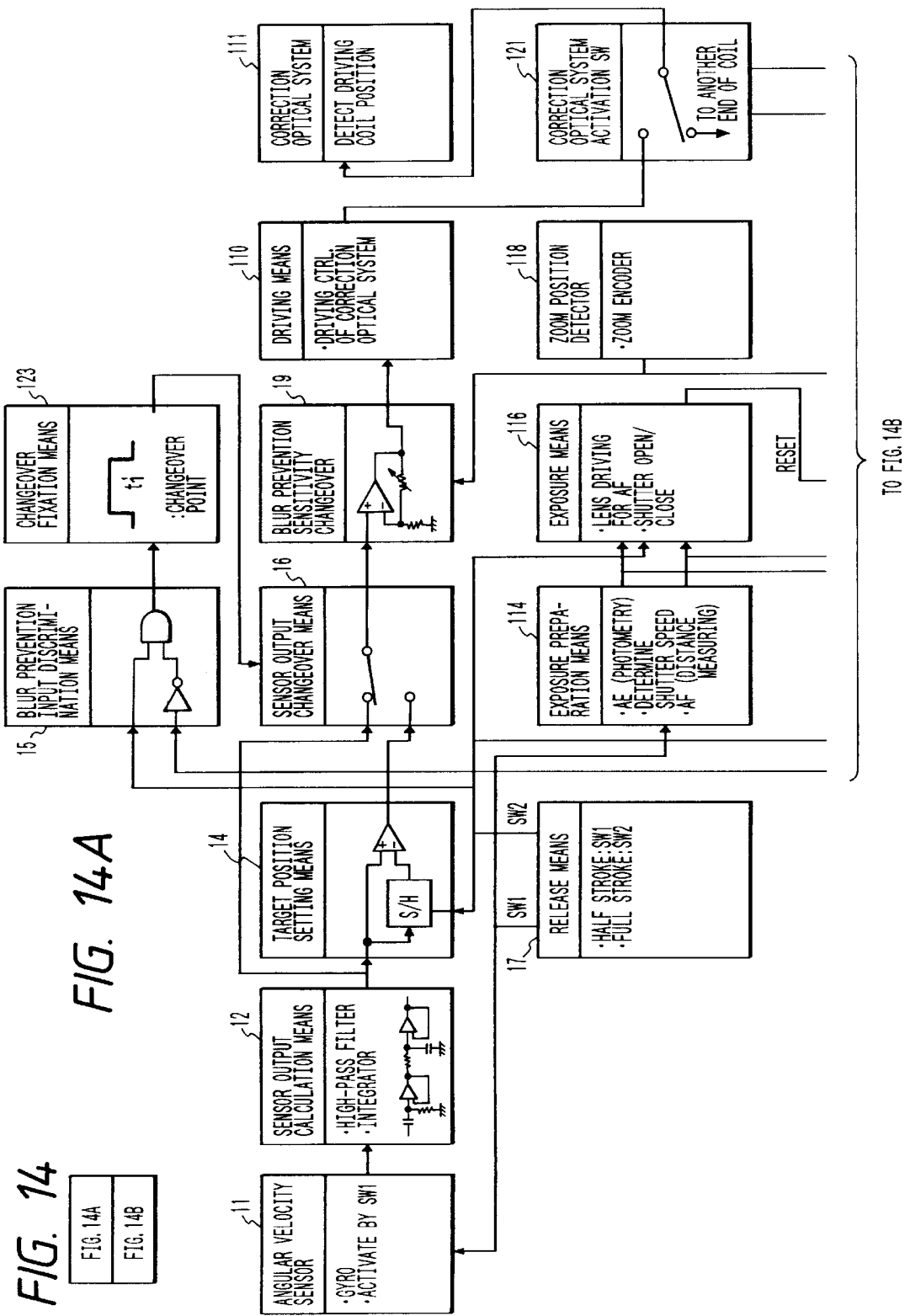

FIG. 17

| MODE NO | AE | | AF | DRIVE | BLUR PREVENTION COMPENSATION | IS BUTTON |
|---|---|---|---|---|---|---|
| 1 | M | MANUAL | ONE-SHOT | SINGLE | OFF | ↑↓ ON |
| 2 | Av | APERTURE PRIORITY AE | ONE-SHOT | SINGLE | OFF | ↑↓ ON |
| 3 | Tv | SHUTTER PRIORITY AE | ONE-SHOT | SINGLE | OFF | ↑↓ ON |
| 4 | P | PROGRAM AE | ONE-SHOT | SINGLE | OFF | ↑↓ ON |
| 5 | ▢ | FULL AUTOMATIC | ONE-SHOT/SERVO | SINGLE | ON | ↑↓ OFF |
| 6 | ☺ | PORTRAIT | ONE-SHOT | CONTINUOUS | ON | ↑↓ OFF |
| 7 | ⛰ | LANDSCAPE | ONE-SHOT | SINGLE | ON | ↑↓ OFF |
| 8 | ✿ | CLOSE-UP | ONE-SHOT | SINGLE | ON | ↑↓ OFF |
| 9 | 🏃 | SPORT | SERVO | CONTINUOUS | OFF | ↑↓ ON |

| FIG. 18A |
| FIG. 18B |

| IS FLG | IS MODE |
|---|---|
| 3n | AUTO CHANGEOVER |
| 3n + 1 | ALWAYS ON |
| 3n + 2 | ALWAYS OFF |

$n = 0, 1, 2 \cdots$

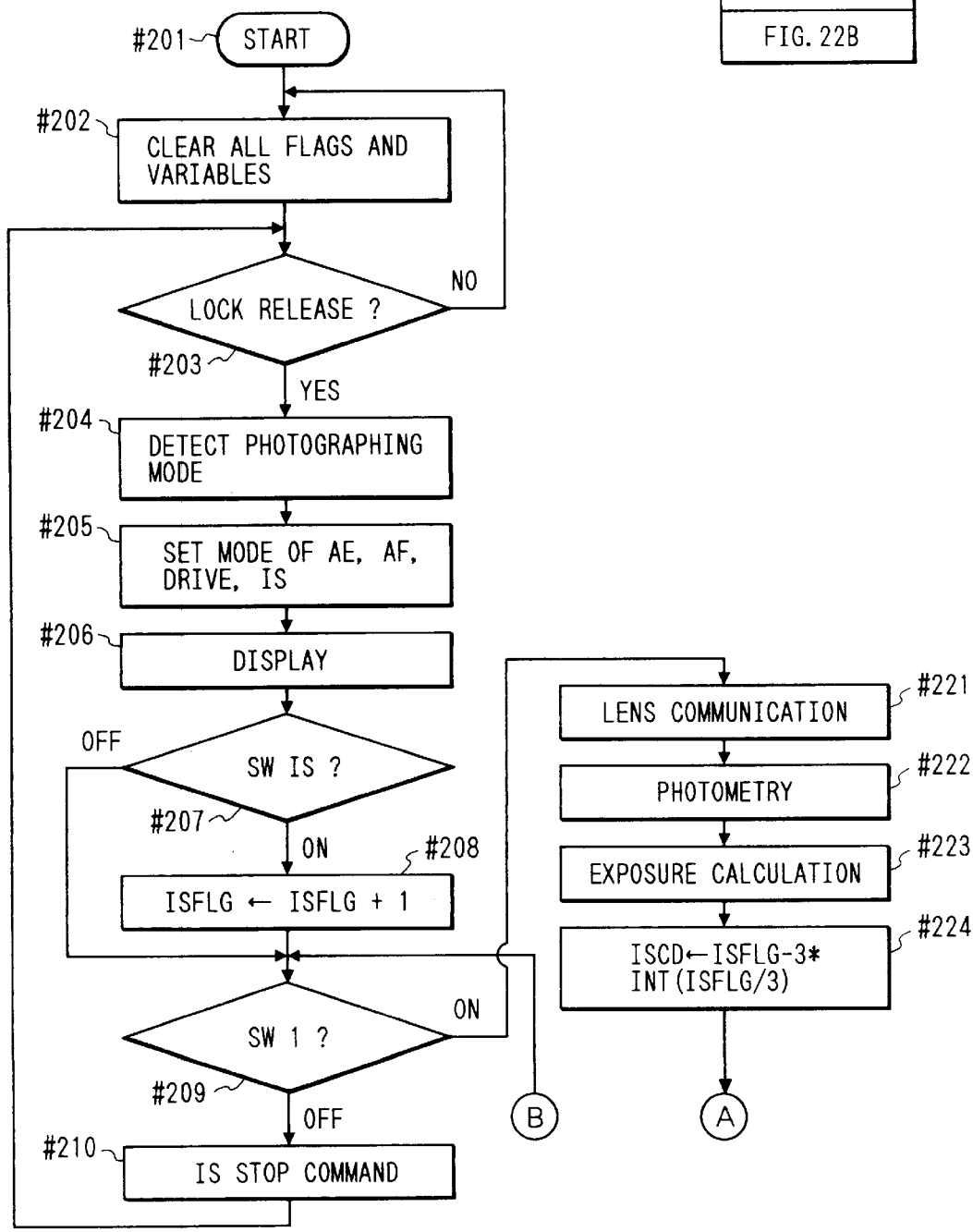
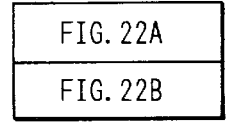

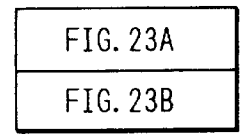
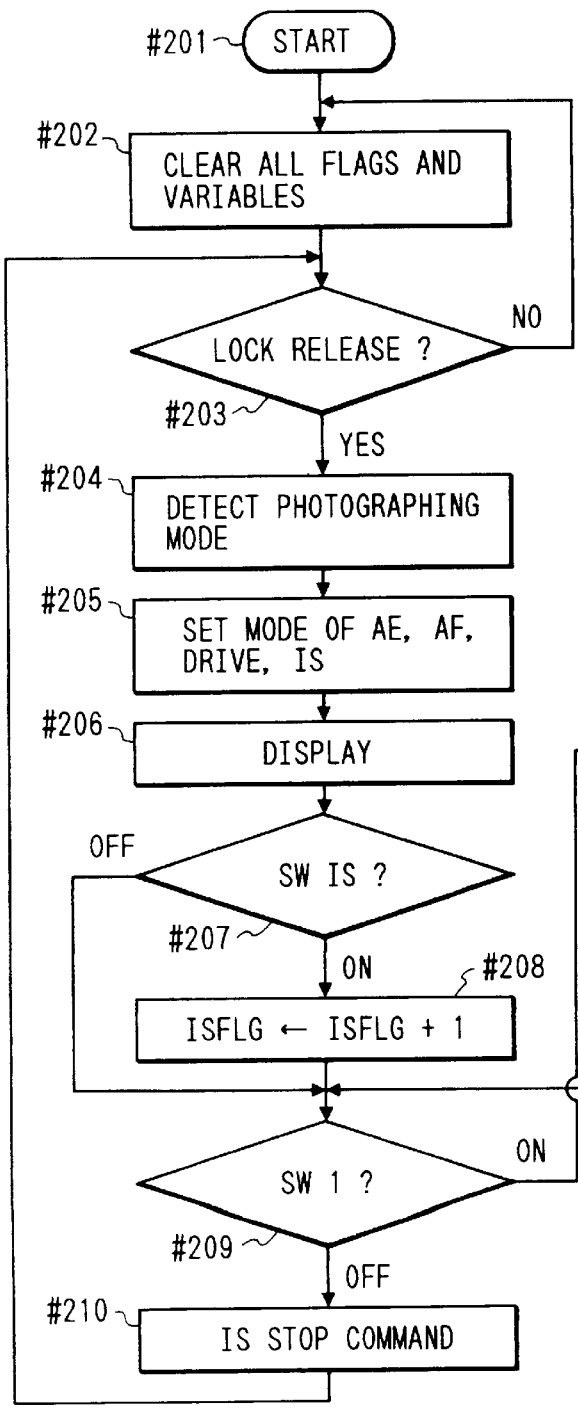
FIG. 23A
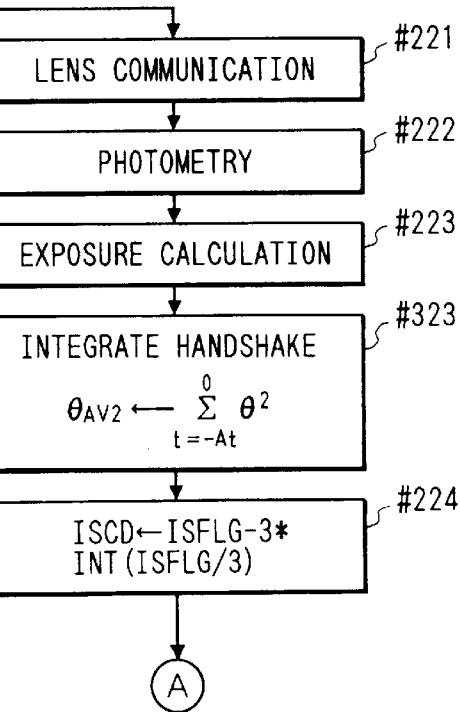

FIG. 24

| MODE NO | AE | | AF | DRIVE | INITIAL MODE OF BLUR COMPENSATION |
|---|---|---|---|---|---|
| 1 | M | MANUAL | ONE-SHOT | SINGLE | ALWAYS OFF |
| 2 | Av | APERTURE PRIORITY AE | ONE-SHOT | SINGLE | AUTO CHANGE |
| 3 | Tv | SHUTTER PRIORITY AE | ONE-SHOT | SINGLE | ALWAYS OFF |
| 4 | P | PROGRAM AE | ONE-SHOT | SINGLE | AUTO CHANGE |
| 5 | ☐ | FULL AUTOMATIC | ONE-SHOT/SERVO | SINGLE | AUTO CHANGE |
| 6 | ◐ | PORTRAIT | ONE-SHOT | CONTINUOUS | ALWAYS ON |
| 7 | △ | LANDSCAPE | ONE-SHOT | SINGLE | ALWAYS ON |
| 8 | ✿ | CLOSE-UP | ONE-SHOT | SINGLE | ALWAYS ON |
| 9 | 🏃 | SPORT | SERVO | CONTINUOUS | ALWAYS OFF |

| FIG. 26A |
| FIG. 26B |

APPARATUS FOR PREVENTING AN IMAGE BLUR PREVENTION DEVICE FROM CHANGING STATES DURING AN IMAGE RECORDING OPERATION

BACKGROUND OF THE INVENTION

1. Field of the Invention

The present invention relates to an apparatus used for suppressing or preventing an image blur generated due to, e.g., a hand shake.

2. Related Background Art

Conventionally, video cameras and still cameras, each of which has an image blur prevention function for preventing an image blur caused by a hand shake upon photographing, have been proposed, and some video cameras are commercially available.

As an image blur prevention apparatus (to be referred to as a blur prevention control apparatus hereinafter) for preventing an image blur even when a camera vibrates upon photographing, various systems of apparatuses (for example, a system of changing the focusing position by deflecting a transmission light beam by displacing some lenses in a photographing optical system) have been proposed.

The conventional blur prevention control apparatus for a camera has the following practical problems to be solved. The relationship between the type of camera and the blur prevention control apparatus will be explained below to clarify these problems.

When a photographer takes a picture of an objects he or she selects the ON or OFF state of the blur prevention control apparatus by systematically discriminating the focal length and shutter speed of the camera and a hand shake state by himself or herself via a finder. For example, even when the focal length is as large as 300 mm, and a hand shake via the finder is conspicuous, if the shutter speed is as high as 1/500 sec, the blur prevention function is not required. On the other hand, even if the focal length is as small as about 100 mm, and a hand shake is not conspicuous, if the shutter speed is as low as 1/60 sec, the blur prevention function is required since a blur is recorded on an image plane.

In other words, the photographer is required to have the capability of instantaneously selecting the ON/OFF state of the blur prevention control apparatus on the basis of various kinds of information.

Thus, a conventional camera with an image blur correction or compensation apparatus has switching or selection means for switching the active or inactive state of the image blur correction apparatus As one of the switching or selection methods, the assignee of the present applicant discloses a method of selecting the active or inactive state of the image blur correction apparatus by a photographer using a special-purpose switch (to be referred to as a manual switching method hereinafter) in, e.g., Japanese Laid-Open Patent Application No. 4-95933. In the camera of this proposal, a switch for selecting the active/inactive state of an image blur correction function is provided to an exchangeable lens of a single-lens reflex camera. When the switch is set at an active position by a photographer, the image blur correction function is activated in response to the ON operation of a first stroke switch of a release button.

However, this switching operation is very troublesome for normal users. On the other hand, recent cameras tend to have many operation switches. With such a tendency, it is not preferable for users to add another switch for a blur prevention function.

Of course, if the blur prevention function is activated in all photographing states, the above-mentioned problem will not be posed. However, when the blur prevention function is always activated, quick consumption of a battery poses another problem.

In the above-mentioned manual switching method, once the active/inactive state of the image blur correction function is set, the active/inactive state of the image blur correction function cannot be quickly switched if it is required to instantly switch the image blur correction function, and a photographing operation must be temporarily interrupted.

When the blur prevention control apparatus is applied to a single-lens reflex camera in which a lens is detachable from a Camera body, a hand shake state can be easily found since most single-lens reflex cameras have high finder magnifications. Furthermore, since the shutter speed is displayed inside or outside the finder, skilled photographers can select the ON/OFF state of the blur prevention control apparatus based on such information, as described above.

However, necessity of the blur prevention function is not limited to such single-lens reflex cameras, and the blur prevention control apparatus must be equipped in cameras such as compact cameras, which can be easily operated. However, when the above-mentioned known apparatus is equipped in a compact camera, the following problems must be solved.

In general, most compact cameras have finder magnifications lower than that of single-lens reflex cameras, and hence, a hand shake state caused by a photographer himself or herself is not easily found. Furthermore, in most compact cameras, the shutter speed is not displayed. Therefore, the criterion of discrimination of the ON/OFF state of the blur prevention control apparatus in a compact camera is only the focal length and an environmental brightness (the shutter speed is discriminated based on the environmental brightness), and a photographer may unexpectedly take a blurred picture without activating the blur prevention function in a situation wherein the blur prevention control apparatus must be turned on to perform a photographing operation.

As another conventional method of switching or selecting the active or inactive state of the image blur correction function, some methods of activating the image blur correction function when a camera determines the necessity of the image blur correction function (to be referred to as an automatic switching method hereinafter) have been proposed. For example, in Japanese Laid-Open Patent Application No. 4-56831 proposed by the present applicant, a detected image blur amount is compared with a predetermined value, which is set in advance, and if the image blur amount is smaller than the predetermined value, the image blur correction function is automatically inactivated. Also, in the proposal of Japanese Laid-Open Patent Application No. 2-181741, if it is recognized that a camera is fixed to a tripod, the image blur correction function is inactivated.

However, with the automatic switching method, when a switching operation against a photographer's will is made, it cannot be stopped. More specifically, the active/inactive state of the image blur correction function is solely determined by the camera, and the photographer's will cannot be reflected.

SUMMARY OF THE INVENTION

It is an object of the present invention to provide a camera with an image blur correction function, which can eliminate a troublesome operation associated with a setting operation of an image blur correction mode, and can arbitrarily change the image blur correction mode in correspondence with a photographer's will.

One aspect of the invention is to provide a control apparatus which is adapted to prevent an image blur in a photographing apparatus and is adapted to be used in an image blur prevention apparatus which changes an image blur prevention effect by inputting a predetermined signal, comprising a control portion for regulating the change in image blur prevention effect of the image blur prevention apparatus upon input of the predetermined signal during image recording of the photographing apparatus.

With this arrangement, the image recording result can be prevented from being adversely influenced by the change in state of the image blur prevention apparatus.

BRIEF DESCRIPTION OF THE DRAWINGS

FIG. 5 is comprised of FIGS. 5A and 5B showing block diagrams of the camera blur prevention control apparatus according to the first embodiment of the present invention;

FIG. 12 is comprised of FIGS. 12A and 12B showing block diagrams of a camera blur prevention control apparatus according to the second embodiment of the present invention;

FIG. 13 is comprised of FIGS. 13A and 13B showing block diagrams of a camera blur prevention control is apparatus according to the third embodiment of the present invention;

FIG. 17 is a table for explaining the operation of the camera in the fifth embodiment of the present invention;

FIG. 24 is a table for explaining the operation of a camera in the eighth embodiment of the present invention;

DETAILED DESCRIPTION OF THE PREFERRED EMBODIMENTS

A blur prevention control apparatus according to the first embodiment of the present invention will be briefly described below with reference to FIG. 1.

Figure 1:
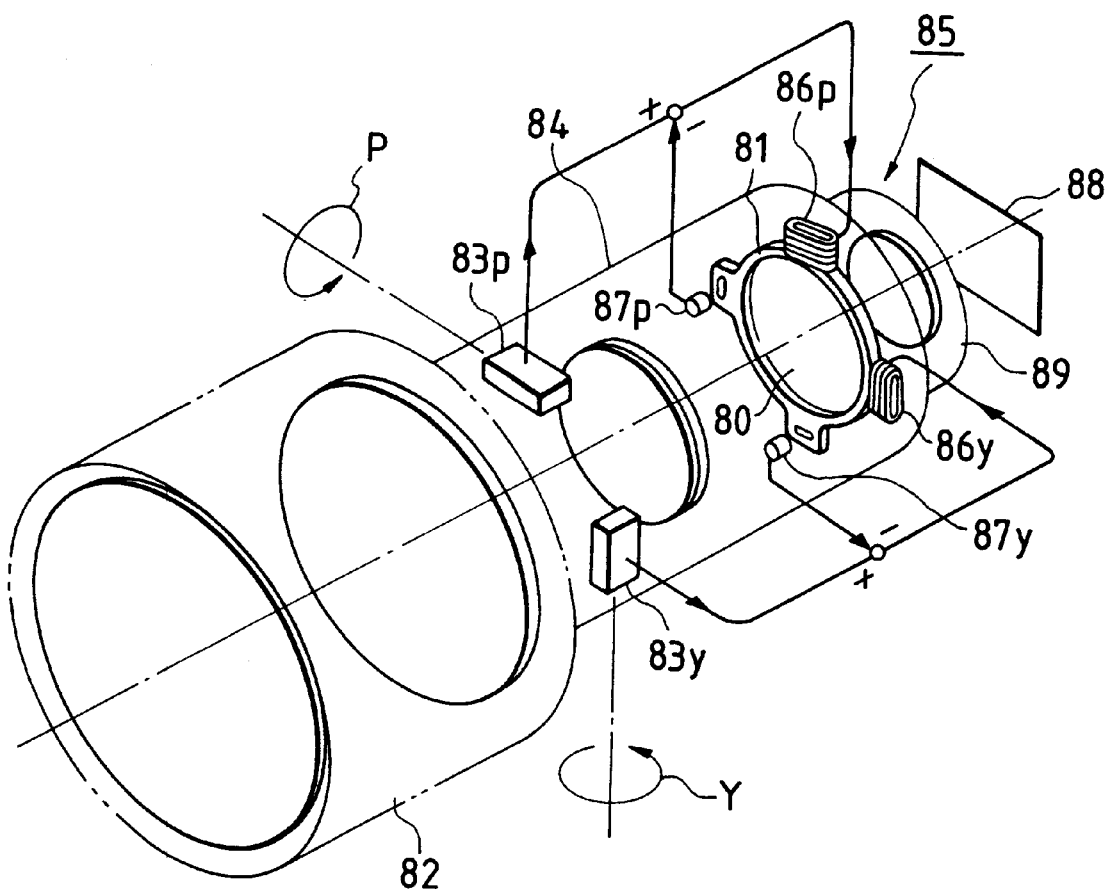
FIG. 1 is a perspective view showing a camera blur prevention control apparatus according to the first embodiment of the present invention.

FIG. 1 is a perspective view of a lens barrel which is equipped with a blur prevention control apparatus proposed by the assignee of the present applicant, and is presented to explain the outline of the blur prevention control apparatus.

Referring to FIG. 1, the lens barrel comprises an outer cylinder 82 of the lens barrel, an inner cylinder 84 accommodated in the outer cylinder 82, an angular displacement detection means 83p which is attached to the outer circumferential surface of the inner cylinder 84 to detect an angular displacement of a pitching P of the lens barrel, an angular displacement detection means 83y which is attached to the outer circumferential surface of the inner cylinder 84 to detect an angular displacement of a yawing Y of the lens barrel, a correction lens 80 for preventing an image blur on the surface of a film 88 even when the lens barrel is vibrated, a correction lens holding frame 81 which holds the lens 80 and is arranged to. face the rear end face of the inner cylinder 84 to be movable in the vertical and horizontal directions, a coil 86p which is attached to the holding frame 81 and constitutes a first electromagnetic driving means for moving the holding frame 81 in the vertical direction, a coil 86y which is attached to the holding frame 81 and constitutes a second electromagnetic driving means for moving the holding frame 81 in the horizontal direction, a vertical position detection means 87p for detecting the position and moving amount of the holding frame 81 when the holding frame 81 is moved in the vertical direction by the first electromagnetic driving means, and a horizontal position detection means 87y for detecting the position and moving amount of the holding frame 81 when the holding frame 81 is moved in the horizontal direction by the second electromagnetic driving means. Each of the angular displacement detection means 83p and 83y is constituted by a detection means comprising, e.g., a vibration gyro as a known angle measuring device, and a calculation circuit for integrating an angular velocity output to convert it into an angular displacement. Each of the position detection means 87p and 87y for detecting, e.g., a change in position of the correction lens holding frame 81 is constituted by a light-emitting element comprising an infrared light-emitting diode and a light-receiving element comprising a known PSD (Position sensing device). The outputs from the angular displacement detection means 83p and 83y (i.e., the vibration sensors) and the output signals from the correction lens position detection means (PSDs) are input to a control circuit (not shown), and are subjected to predetermined processing. Thereafter, the two electromagnetic driving means including the coils 86p and 86y are driven by the output signal from the control circuit, thus performing the position control and the driving control of the correction lens 80. An assembly constituted by the correction lens 80 and the lens holding frame 81 will be referred to as a correction optical system 85 hereinafter.

Figure 2B:
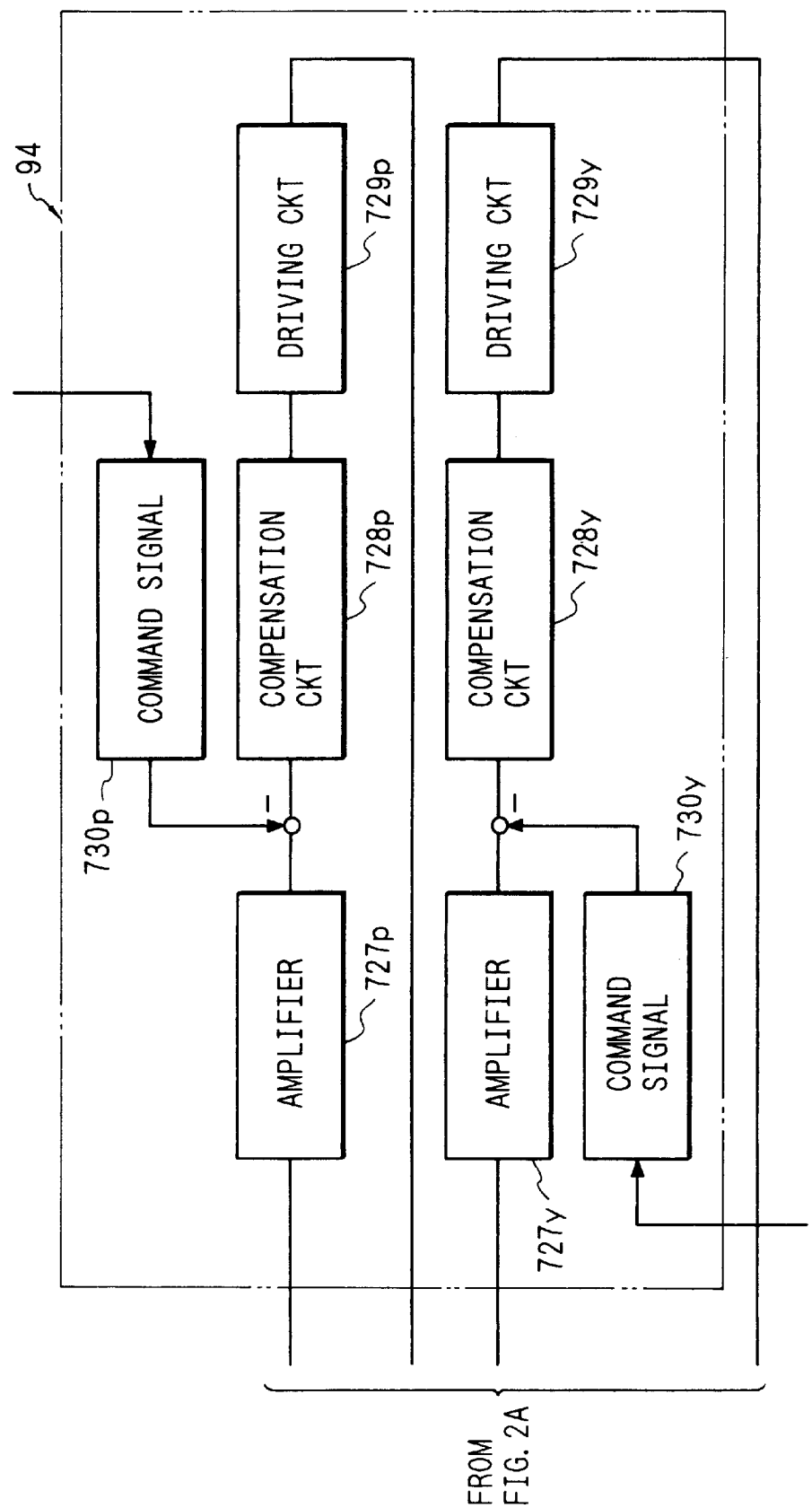
FIG. 2 is comprised of FIGS. 2A and 2B showing exploded perspective views of the detailed arrangement of the camera blur prevention control apparatus according to the first embodiment of the present invention.
Figure 3:
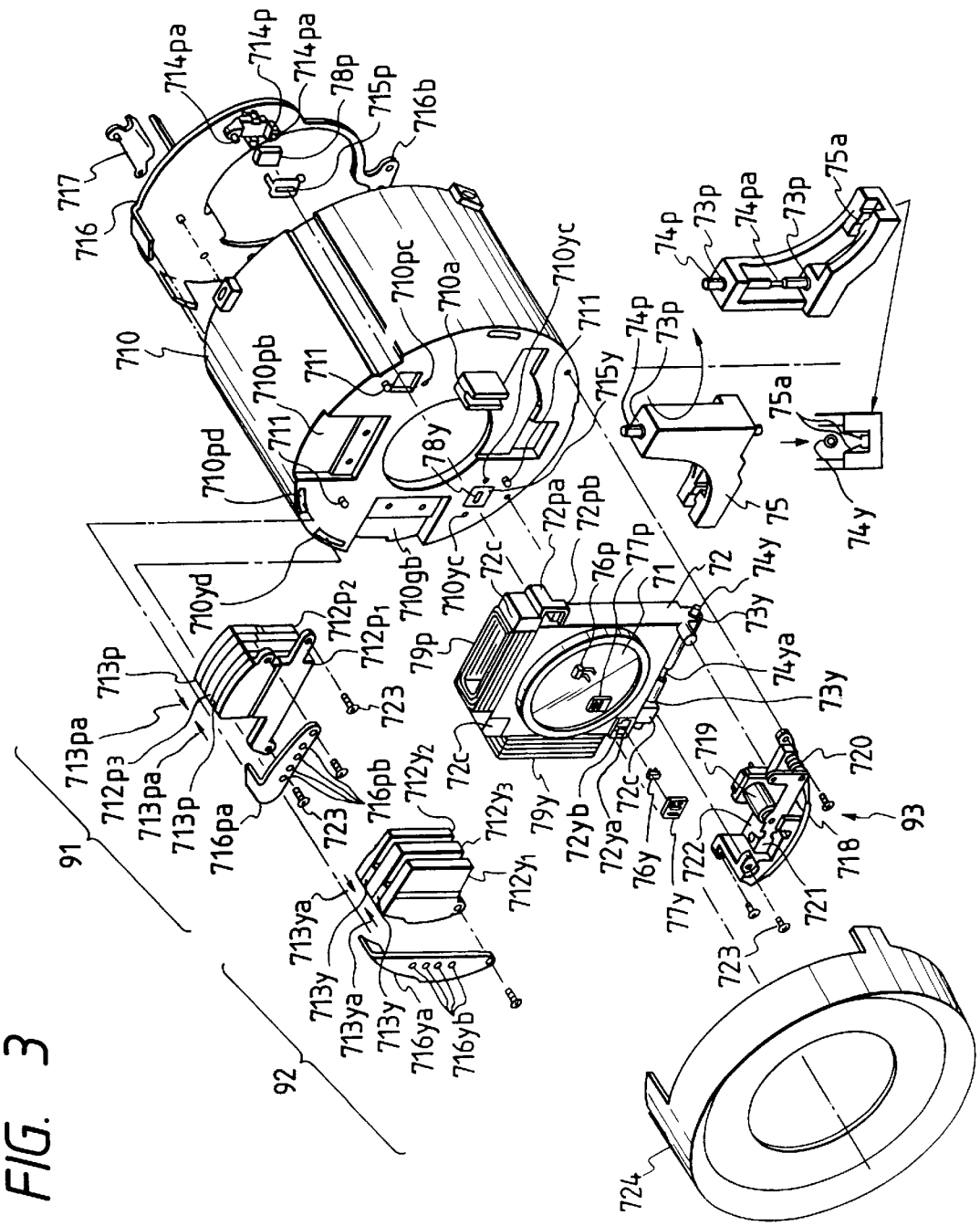
FIG. 3 is an exploded perspective view showing the details of a mechanical structure portion of the arrangement shown in FIGS. 2A and 2B.

The detailed structure of the lens barrel described above with reference to FIG. 1 will be described below with reference to FIGS. 2A, 2B and 3. FIGS. 2A, 2B and 3 are exploded perspective views of another lens barrel which has substantially the same structure as that of the lens barrel described above with reference to FIG. 1 when viewed from the object side (i.e., from the front side). In FIGS. 2A, 2B and 3, the outer cylinder 82 and the angular displacement detection means 83p and 83y are not shown. FIGS. 2A and 2B illustrate an example of the control circuit, which is not depicted in FIG. 1.

Since the reference numerals used in FIG. 1 are different from those used in FIGS. 2A, 2B and 3, the correspondence between the constituting elements denoted by the reference numerals in FIG. 1 and those denoted by the reference numerals in FIGS. 2A, 2B and 3 will be explained below prior to the description of FIGS. 2A, 2B and 3.

Referring to FIGS. 2A, 2B and 3, a lens barrel 710 corresponds to the inner cylinder 84 in FIG. 1, and a correction lens 71 corresponds to the correction lens 80 in FIG. 1. A lens support frame 72 corresponds to the correction lens holding frame 81 in FIG. 1, a coil 79p attached to the lens support frame 72 corresponds to the coil 86p in FIG. 1, a coil 79y attached to the support frame 72 corresponds to the coil 86y in FIG. 1. Two light-emitting elements 76p and 76y attached to the two positions on the lens support frame 72 are respectively paired with two position detection elements 78p and 78y such as PSDs attached to the lens barrel 710 to constitute position detection means corresponding to the position detection means 87p and 87y in FIG. 1. In addition, the lens barrel 710 has a cover 724.

Since the correspondence between the structure shown in FIGS. 2A, 2B and 3 and the arrangement which has already been described above with reference to FIG. 1 is clarified, as described above, the arrangement of the prior art by the present applicant shown in FIGS. 2A, and 2B and 3 will be explained below.

Referring to FIGS. 2A and 2B, a magnetic pole unit 91 constitutes an electromagnetic driving means in the vertical direction together with the coil 79p. The magnetic pole unit 91 is fixed to the lens barrel 710, in such a manner that it is arranged on a recess portion 710pb on the rear end face of the lens barrel 710, and a yoke 712$p_3$ is inserted in the coil 79p. On the other hand, a magnetic pole unit 92 constitutes an electromagnetic driving means in the horizontal direction, and is fixed to the lens barrel 710, in such a manner that it is arranged on a recess portion 710yb on the rear end face of the lens barrel 710, and a yoke 712$y_3$ is inserted in the coil 79y. Each of the magnetic pole units 91 and 92 is constituted by sandwiching two magnets among three yokes More specifically, the unit 91 has a structure obtained by clamping two magnets 713p among three yokes 712$p_1$ to 712$p_3$, and the unit 92 has a structure obtained by clamping two magnets 713y among three yokes 712$y_1$ to 712$y_3$.

The correction lens support frame 72 is held by a support arm 75 shown in FIG. 3. More specifically, the lens support frame 72 is supported by the arm 75 to be movable in the vertical and horizontal directions, and the arm 75 is attached to a pawl portion 710a on the rear end face of the lens barrel 710.

A lock device, i.e., locking means 93 prohibits the movement of the correction lens support frame 72. The lock device 93 comprises an electromagnetic plunger 719 for locking/unlocking the support frame 72, and a spring 720 for holding an unlocked state. The lock device 93 is arranged to face the lower portion, at the rear end side, of the support frame 72, and is fastened to the rear end face of the lens barrel 710 using screws.

A correction optical system driving control circuit 94 for performing driving control of the coils 79p and 79y of the two electromagnetic driving means is connected to these coils 79p and 79y, and is also connected to the two position detection elements 78p and 78y such as PSDs as position detection signal output means of the correction lens support frame 72. Furthermore, the circuit 94 is connected to a camera control circuit and a lens barrel control circuit (neither are shown).

Since the correspondence between the structure shown in FIGS. 2A, 2B and 3 and the arrangement which has already been described above with reference to FIG. 1 is clarified, as described above, the prior art of the blur prevention control apparatus with the arrangement shown in FIGS. 2A to 4 shown in FIGS. 2A to 4 will be further explained below.

As shown in FIG. 3, a bearing 73y is fitted in the correction lens support frame 72 under pressure, and a support shaft 74y is supported by the bearing 73y to be slidable in the axial direction. A recess portion 74ya of the support shaft 74y is fitted on a pawl 75a of the support arm 75 shown in FIG. 3. Also, as shown in FIG. 3, a bearing 73p is fitted in the support arm 75 under pressure, and a support shaft 74p is supported by the bearing 73p to be slidable in the axial direction.

The light-emitting elements 76p and 76y such as IRED-LEDs are adhered to light-emitting element attachment holes 72pa and 72ya of the support frame 72, and their terminals are soldered to lids 77p and 77y (adhered to the support frame 72) which also serve as connection circuit boards. The support frame 72 has slits 72pb and 72yb, and light beams emitted from the light-emitting elements 76p and 76y are incident on the PSDs (position detection elements) 78p and 78y (to be described later) via the slits 72pb and 72yb.

The coils 79p and 79y are also adhered to the support frame 72, and their terminals are soldered to the lids 77p and 77y. Support balls 711 are fitted in the lens barrel 710 (at three positions), and a recess portion 74pa of the support shaft 74p is fitted on the pawl portion 710a of the lens barrel 710.

The yokes $712p_1$, $712p_2$, and $712p_3$, and the magnets 713p are adhered to each other in a stacked state, and similarly, the yokes $712y_1$, $712y_2$, and $712y_3$, and the magnets 713y are adhered to each other in a stacked state. Note that the magnets are polarized in the directions of arrows 713pa and 713ya.

The yokes $712p_2$ and $712y_2$ are fixed to the recess portions 710pb and 710yb of the lens barrel 710 using screws.

The position detection elements 78p and 78y such as PSDs are adhered to sensor bases 714p and 714y (714y is not shown), and are covered by sensor masks 715p and 715y. The terminals of the position detection elements 78p and 78y are soldered to a flexible printed board 716. Joggles 714pa and 714ya (714ya is not shown) of the sensor bases 714p and 714y are fitted in mounting holes 710pc and 710yc of the lens barrel 710, and the flexible printed board 716 is fixed to the lens barrel 710 via a flexible printed board stay 717 using screws. Lugs 716pa and 716ya of the flexible printed board 716 are fixed using screws on the yokes $712p_1$ and $712y_1$ via holes 710pd and 710yd of the lens barrel 710, respectively. The terminals of the coils and the light-emitting elements on the coil terminal lids 77p and 77y are connected to the lug portions 716pa and 716yaand land portions 716b of the flexible printed circuit board 716, and polyurethane-coated copper wires (triple stranded lines).

The electromagnetic plunger 719 is fixed by screws to a chassis 718 of the locking means 93, and one end of the plunger 719 is fitted in a lock arm 721 which charges the spring 720. The arm 721 is rotatably attached to the chassis 718 by an axial screw 722.

The chassis 718 of the locking means 93 is fixed by screws to the lens barrel 710, and the terminals of the electromagnetic plunger 719 are soldered to the land portions 716b.

Adjusting screws 723 (three positions) with spherical distal end portions (FIG. 2A) are screwed in and extend through the yokes 712p and the chassis 718 of the lock device 93, and the adjusting screws 723 and the support balls 711 sandwich the sliding surface (a hatched portion 72c in FIG. 3) of the support frame 72 therebetween. The adjusting screws 723 are screwed in and adjusted, so that they oppose the sliding surface 72c with a small clearance.

The cover 724 is adhered to the lens barrel 710 to cover the above-mentioned correction optical system.

In the correction optical system driving control circuit 94 shown in FIG. 2B, the Outputs from the position detection elements 78p and 78y are amplified by amplifiers 727p and 727y, and are input to the coils 79p and 79y. As a result, the support frame 72 is driven, and the outputs from the position detection elements 78p and 78y change. When the driving directions (polarities) of the coils 79p and 79y are set in directions to decrease the outputs from the position detection elements 78p and 78y, the support frame 72 is stabilized at a position where the outputs from the position detection elements 78p and 78y become almost zero on the basis of the driving forces from the coils 79p and 79y.

Note that compensation circuits 728p and 728y are circuits for more stabilizing the control system, and driving circuits 729p and 729y are circuits for supplying currents to the coils 79p and 79y.

When a control circuit (not shown) supplies command signals 730p and 730y to the circuit 94, the support frame 72 is driven to be very faithful to the command signals 730p and 730y.

The above-mentioned technique for controlling the coils by negatively feeding back the position detection outputs is called a position control technique, and when a hand shake amount is input as the command signals 730p and 730y, the support frame 72 is driven in proportion to the hand shake amount.

Figure 4:
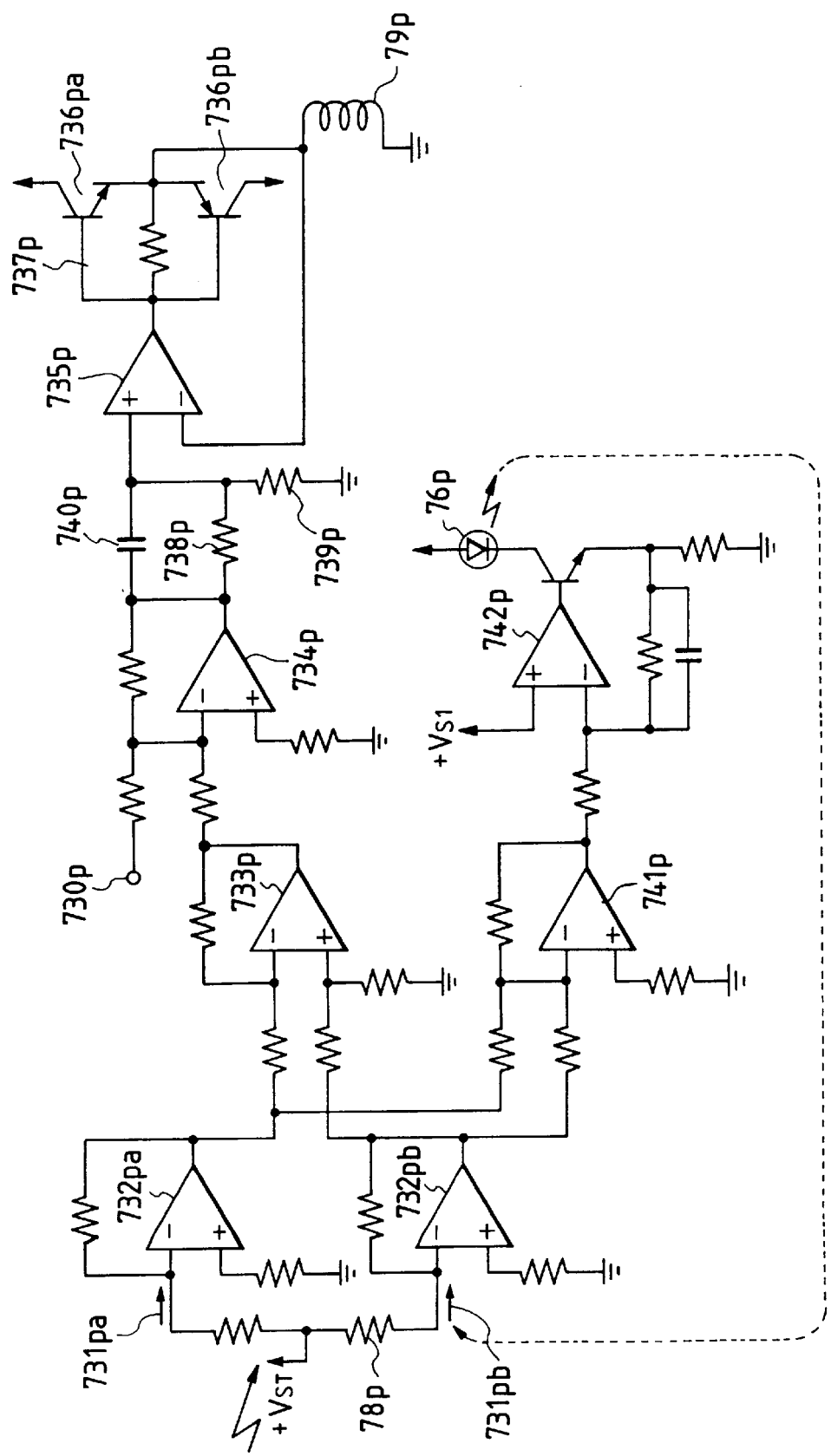
FIG. 4 is a circuit diagram showing the detailed circuit of the electrical structure of the arrangement shown in FIGS. 2A and 2B.

FIG. 4 is a detailed circuit diagram of the correction optical system driving control circuit 94 for driving the correction optical system, and illustrates only the control system in a pitch direction p (FIG. 2A) (the control system in a yaw direction y has the same arrangement).

Referring to FIG. 4, current-voltage conversion amplifiers 732pa and 732pb convert photocurrents 731pa and 731pb into voltages, and a differential amplifier 733p calculates a difference (an output proportional to the position, in the pitch direction p, of the support frame 72) between the outputs from the current-voltage conversion amplifiers 732pa and 732pb. Note that the current-voltage conversion amplifiers 732pa and 732pb, and the differential amplifier 733p correspond to the amplifier 727p shown in FIG. 2B.

A command amplifier 734p adds the command signal 730p to the output from the differential amplifier 733p, and outputs the sum signal to a driving amplifier 735p. The driving circuit 729p shown in FIG. 2B is constituted by the driving amplifier 735p, transistors 736pa and 736pb, and a resistor 737p.

Resistors 738p and 739p, and a capacitor 740p constitute a known phase advance circuit, which corresponds to the compensation circuit 728p shown in FIG. 22.

An addition amplifier 741p calculates a sum of the outputs from the current-voltage conversion amplifiers 732pa and 732pb (i.e., a sum total of the light-receiving amounts on the position detection element 78p), and outputs the sum to a light-emitting element driving amplifier 742p.

Since the light-emitting amount of the light-emitting element 76b changes very unstably depending on, e.g., temperature, the position detection sensitivity of the differential amplifier 733p changes accordingly. However, since the light-emitting element is driven by the sum total of the light-receiving amounts on the position detection element 78p (light-receiving amount constant control for increasing the light-emitting amount of the light-emitting element 76p when the sum total of the light-receiving amounts decreases), a change in position detection sensitivity can be suppressed.

<First Embodiment>

The arrangement for controlling the above-mentioned arrangement shown in FIGS. 1 to 4 will be described below.

FIGS. 5A and 5B show block diagrams of a camera blur prevention control apparatus according to the first embodiment of the present invention.

Referring to FIGS. 5A and 5B, an angular velocity sensor (i.e., a vibration detection means corresponding to the means 83p and 83y in FIG. 1) 11 such as a vibration gyro is started in response to a signal SW1 from a switch SW1 which is turned on at the half stroke position of a release button (release means) of the camera. A sensor output calculation circuit 12 integrates the output from the angular velocity sensor 11 to generate an angle output. A blur amount discriminator 13 compares the output from the angular velocity sensor 11 with a reference range (defined by a positive constant value const and a negative constant value–const). When the amplitude of the blur angular velocity exceeds the upper limit of the reference range, an OR gate 13a of the discriminator 13 generates an output. A target position setting means 14 is constituted by a S/H circuit 14a and a differential circuit 14b. When a signal SW2, which is generated at the full stroke position of the release button of a release means 17, is input, the S/H circuit 14*a* holds the output from the sensor output calculation means 12. Before the signal SW2 is input, the S/H circuit 14*a* is in a sampling state. Therefore, the two input terminals of the differential circuit 14*b* receive identical outputs, and the output from the differential circuit 14*b* is zero. However, when the S/H circuit 14a is set in a holding state immediately after the signal SW2 is input, the differential circuit 14*b* begins to continuously generate an output from zero. More specifically, the target position setting means 14 serves as a switch for turning on/off the output. If a simple switch is used, a large input may be suddenly input when the switch is turned on. However, with this arrangement, the input starts from zero when the signal SW2 is input.

A blur prevention input discrimination means 15 generates an output when a switch SW2 is turned on, and a blur prevention discriminator 112 generates no output (the signal SW2 is input to an AND gate 15*a*, and the output from the blur prevention discriminator 112 is input to an inverter 15*b*). The output from the means 15 is input to a changeover fixation means 123. The changeover fixation means 123 generates an output for a period $t_1'$ (e.g., 1 sec) from the input timing of the signal from the means 15, so as to connect a switch 16*a* of a sensor output changeover means 16 to a terminal 16*c* (normally, the switch 16*a* is connected to a terminal 16*b*).

A blur prevention sensitivity changeover means 19 amplifies a blur signal from the sensor output changeover means 16 on the basis of an output from a zoom position detector 118. This is because blur prevention cannot be achieved with high precision unless the driving amount of the correction optical system for the blur signal is changed in correspondence with the focal length of the lens. The output (corresponding to the command signals 730*p* and 730*y* in FIG. 2B) from the blur prevention sensitivity changeover means 19 is input to a driving means 110, and a correction optical system 111 is driven to be faithful to this signal.

The two terminals of each of driving coils (the coils 79*p* and 79*y* in FIG. 2A) of the correction optical system 111 (the correction lens 71 in FIG. 2A) are normally short-circuited (a switch contact 121a of a correction optical system activation switch (SW) 121 is connected to a terminal 121*c*). However, in response to an input from a blur prevention continuation means 117, the switch contact 121*a* is connected to a terminal 121*b*, and the correction optical system 111 is driven by the driving means 110. An exposure preparation means 114 performs a photometry operation (AE), a shutter speed determining operation, and a distance measuring operation (AF) upon reception of the signal SW1 which is generated at the half stroke position of the release button of the release means 17. An exposure means 116 drives the lens to an in-focus position upon reception of the distance measurement signal from the exposure preparation means 114. Note that the driving operation of the lens to the in-focus position may be performed inside the exposure preparation means 114. The exposure means 116 opens/closes a shutter on the basis of shutter speed information from the exposure preparation means 114 in response to the signal SW2 generated at the full stroke position of the release button of the release means 17. A timer 1 (18) continuously generates an output for a period $t_2$ (100 msec) from when the signal is input from the blur amount discriminator 13. When another signal is input from the blur amount discriminator 13 during this period, the timer 1 extends its output period. More specifically, the timer 1 continuously generates an output as long as the blur amount discriminator 13 continuously generates a signal during the period $t_2$. The blur prevention discriminator 112 receives a signal (representing a large blur) from the timer 1 (18), shutter speed information from the exposure preparation means 114, focal length information obtained by the focusing operation, and focal length information from the zoom position detector 118, and performs a calculation using the received information to discriminate if the blur prevention function is to be activated. When the discriminator 112 discriminates that the blur prevention function is to be activated, it generates an output.

Figure 6:
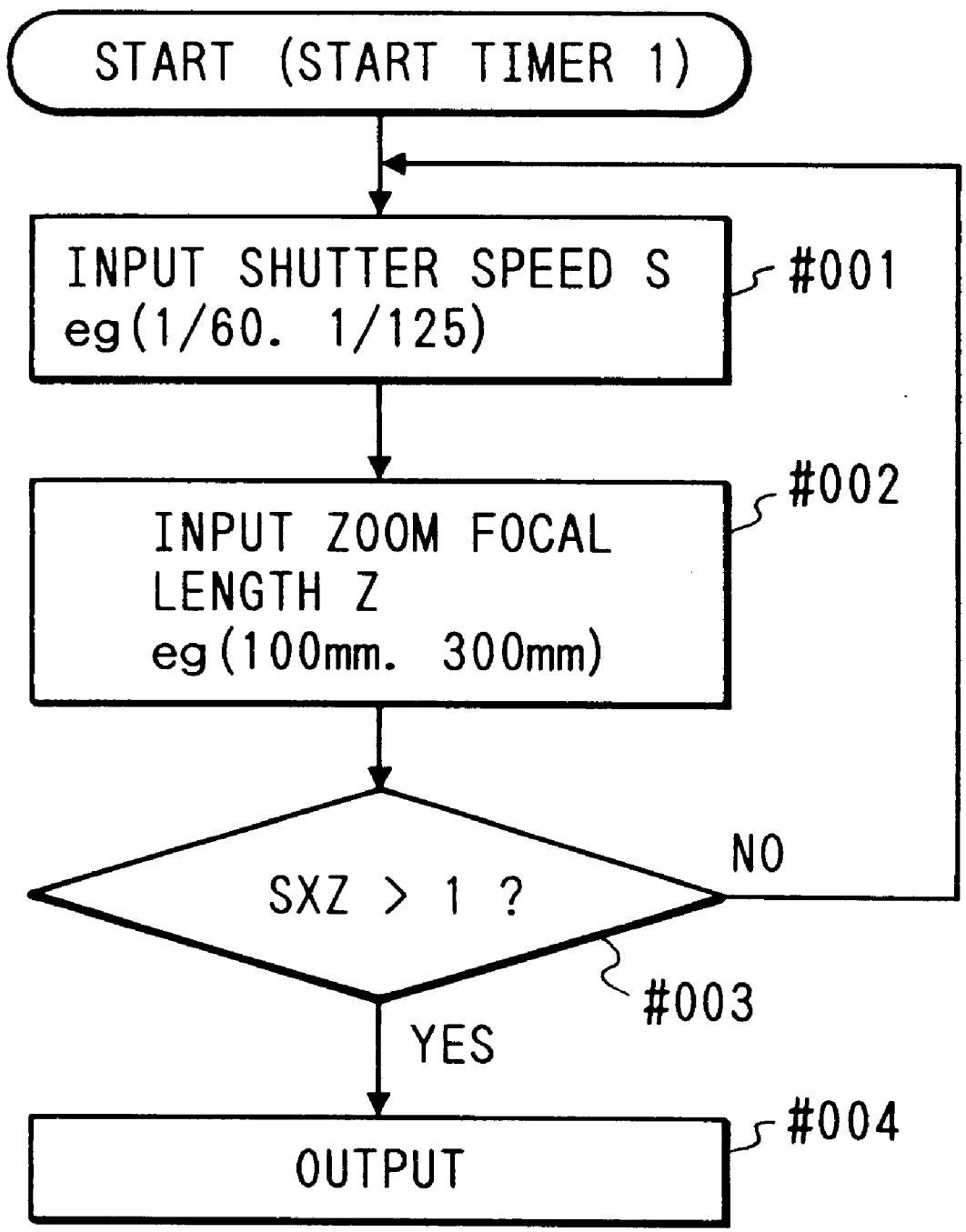
FIG. 6 is a flow chart showing an example of the control operation executed in a blur prevention discriminator 112 in the arrangement shown in FIG. 5B

For example, when a product of the shutter speed and the focal length (e.g., 1/60×300=5) is equal to or larger than 1and the timer 1 (18) generates an output, the discriminator 112 generates an output for performing blur prevention. In practice, the series of operations are processed by a microcomputer. As shown in the flow chart in FIG. 6, this flow starts in . response to a signal input from the timer 1 (18). A shutter speed S of the camera is input in step 001, and a zoom focal length Z (e.g., 300 mm) is calculated in step 002. In step 003, S×Z is calculated. If a product calculated in step 003 is smaller than 1, the flow returns to step 001 to prepare for the next operation; otherwise, the flow advances to step 004 to generate an output.

A blur detection activation means 115 generates an output for a period $t_1$ (e.g., 1 sec) from the output from the discriminator 112. $t_1$ is set to be a lowest shutter speed capable of performing blur prevention (if the shutter speed is too low, since a very low-frequency blur component which is generated when the body of a photographer vibrates during a photographing operation, and cannot be prevented is included, high-precision blur prevention cannot be achieved).

In response to the output from the means 115, the switch contact 121*a* of the correction optical system activation switch (SW) 121 is connected to the terminal 121*b*, as described above, thus starting blur prevention. More specifically, when the blur is large, the shutter speed is low, the focal length is large, the switch SW2 is ON, and the like., blur prevention is performed. The blur prevention continuation means 117 is reset by an exposure end signal from the exposure means 116. That is, blur prevention is stopped upon completion of exposure.

The position signal of the correction optical system 111 (i.e., the output signals from the position detection elements 78*p* and 78*y* in FIGS. 2A to 4) is input to a driving range detector 113. The driving range detector 113 generates an output when the correction optical system falls within a predetermined driving range (which can he varied by a signal from the zoom position detector 118; if the focal length is large, the predetermined driving range is narrowed), and supplies the output to a blur prevention termination discriminator 119.

Figure 7:
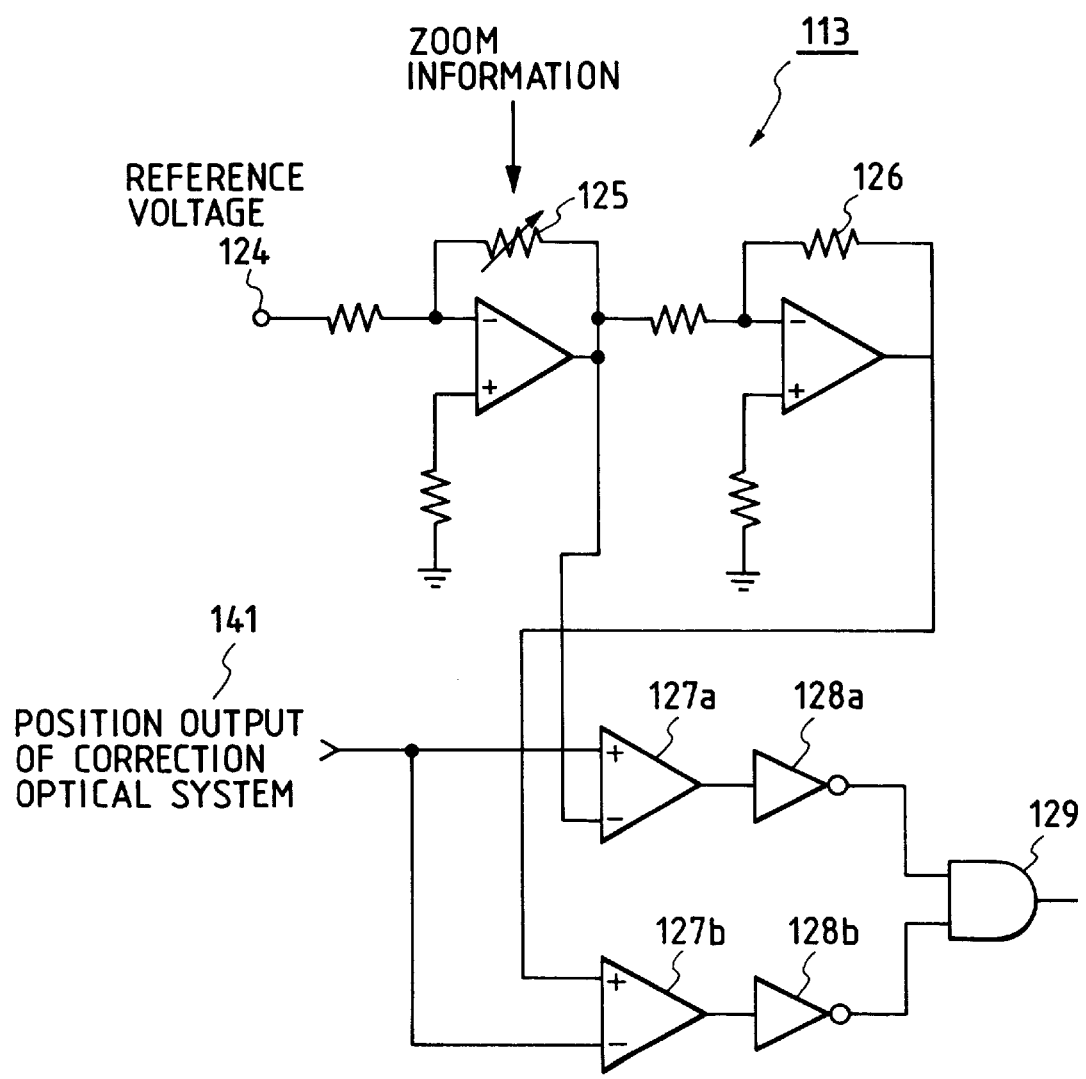
FIG. 7 is a circuit diagram showing the detailed circuit of a driving range detector 113 in the arrangement shown in FIG. 5B.

FIG. 7 is a detailed circuit diagram of the driving range detector 113. A position detection output 141 of the correction optical system is input to the inverting terminal and the non-inverting terminal of two comparators 127*a* and 127*b*, respectively. A comparison reference value of the comparator 127*a* is obtained by inputting a reference signal 124 via an amplifier (with a small gain when zoom information indicates the telephoto side) 125 whose gain is variable in correspondence with zoom information (the gain is varied by switching based on a zoom signal or by a known resistivity changing method using Cds), and a comparison reference value of the comparator 127*b* is obtained by inverting the output from the amplifier 125 by an inverter 126. The outputs from the comparators 127*a* and 127*b* are input to an AND gate 129 via inverters 128*a* and 128*b*, respectively. Either one of the comparators 127a and 127b generates an output as long as the position detection signal falls outside the predetermined range, and neither of the comparators generates an output when the position detection signal falls within the predetermined range. Therefore, both the inverters 128a and 128b generate outputs, and the AND gate 129 generates an output.

The blur prevention termination discriminator 119 resets the blur prevention continuation means 117 (i.e., stops blur prevention) when no signal is input from the blur prevention discriminator 112, and the correction optical system falls within the predetermined driving range.

A blur prevention indicator 120 performs a display when the blur prevention discriminator 112 generates an is output, i.e., the blur prevention is to be performed. A blur detection recording means 122 records data indicating that blur prevention is performed in response to the signal input from the blur prevention continuation means 117 on a data pack of the camera, a film, or the like.

Figure 8:
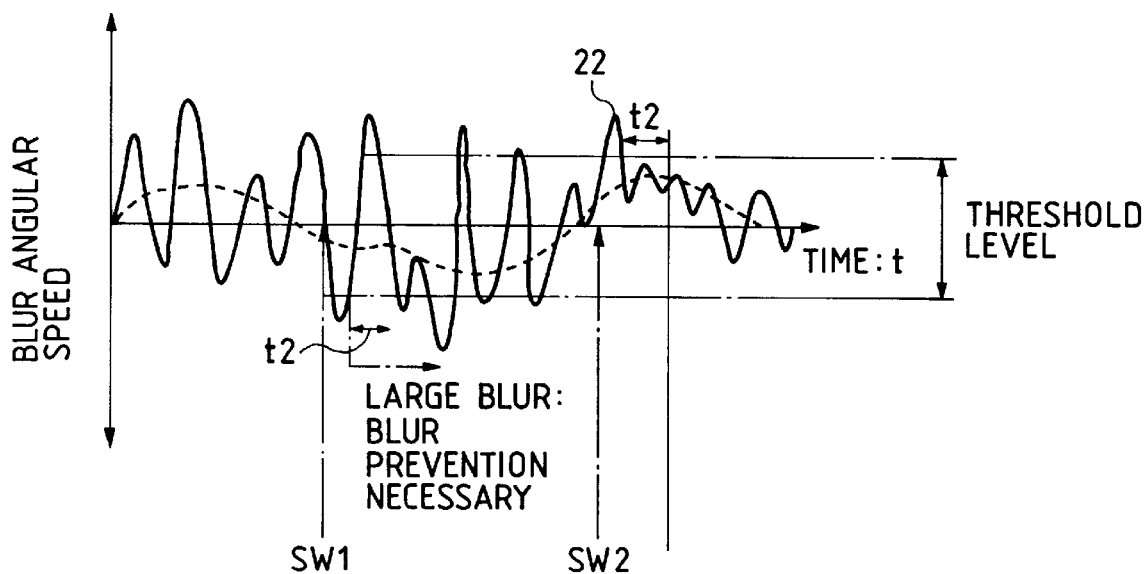
FIG. 8 is a chart showing the relationship among the waveforms of an output signal from a blur angular velocity sensor and a hand shake vibration, and two signals interlocked with the operation of a release switch of a camera.
Figure 9:
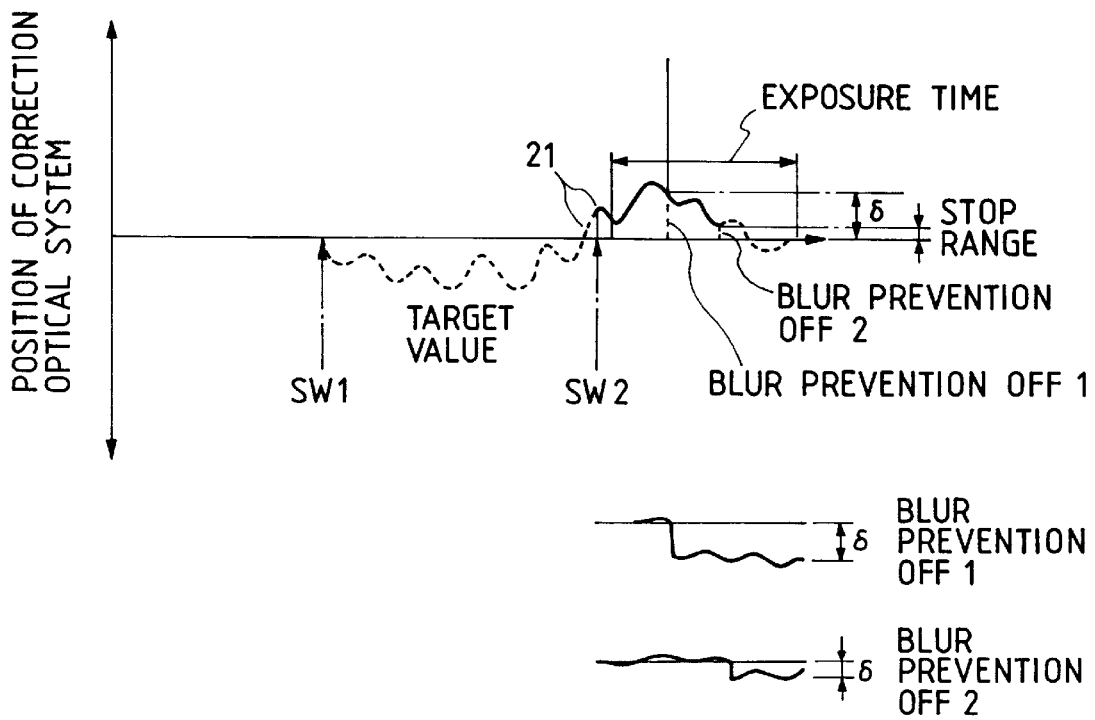
FIG. 9 is a chart showing the relationship among a hand shake vibration, a signal output from the angular velocity sensor, and the driving position of a correction lens upon exposure of a camera, and showing a shift in stop position of the correction lens when blur prevention is not performed.

The operation of the above-mentioned arrangement will be described below. In FIGS. 8 and 9, a broken curve 21 represents the waveform of a hand shake, and a solid curve 22 represents the output (hand shake angular velocity) from the angular velocity sensor 11 at that time. The angular velocity sensor 11 is activated when the switch SW1 is turned on. When the output from the sensor 11 exceeds a threshold level, the blur amount discriminator 13 generates an output. When it is determined based on the shutter speed and focal length information at that time that blur prevention is necessary, the blur prevention discriminator 112 generates an output, and the blur prevention indicator 120 displays that blur prevention is going to be performed. Upon operation of the switch SW2, the blur detection activation means 115 generates an output, and blur prevention is started via the blur prevention continuation means 117.

When the output from the angular velocity sensor becomes continuously equal to or smaller than the threshold level for the period $t_2$ or longer after the operation of the switch SW2, the blur prevention discriminator 112 stops its output. However, the blur prevention continuation means 117 continues the blur prevention for the period $t_1$ for the following reason. If the blur prevention is stopped at a timing of "blur prevention OFF 1" in FIG. 9, since the correction optical system is returned to the neutral position at that timing, a shift amount δ is recorded on an image as a blur. However, when the correction optical system falls within the predetermined driving range (a stop range in FIG. 9), the blur prevention termination discriminator 119 generates an output (the correction optical system falls within the predetermined driving range and the blur prevention discriminator does not generate any output) to reset the blur prevention continuation means 117, thereby stopping the blur prevention. In this case, since the correction optical system is located in the vicinity of the neutral position, even when the blur prevention is turned off (a timing "blur prevention OFF 2"), a shift amount δ required for the correction optical system to return to the neutral position is very small, and is negligible as a blur. For this reason, the blur prevention is turned off relatively early in terms of power saving.

Figure 10:
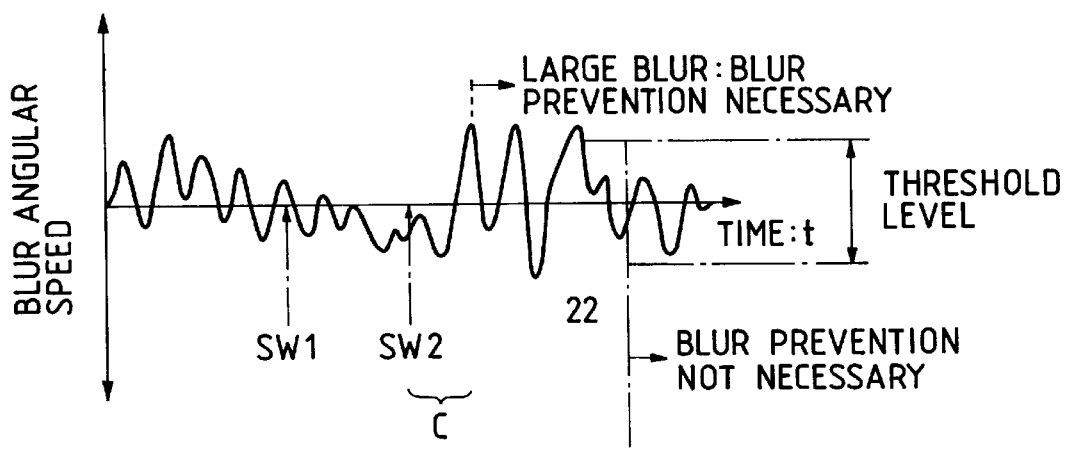
FIG. 10 is a chart for explaining the necessity of blur prevention during exposure of the camera.
Figure 11:
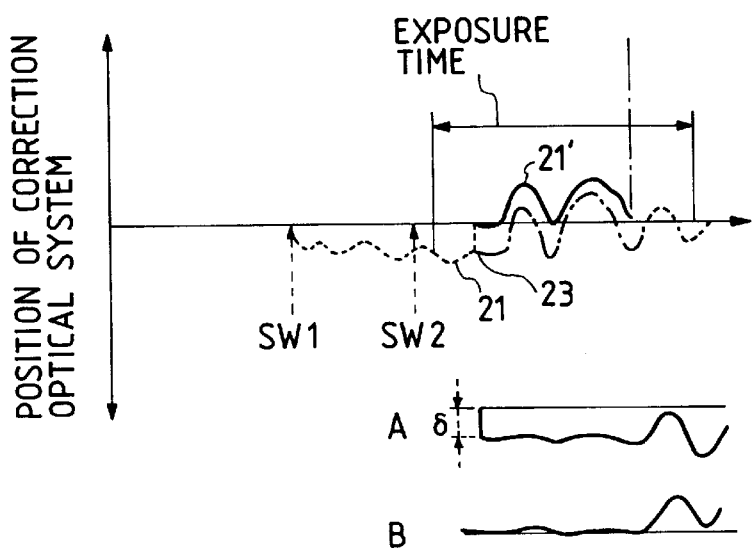
FIG. 11 is a chart for explaining the operation of the correction lens executed when blur prevention is started during exposure of the camera.

A case will be described below wherein the output 22 from the angular velocity sensor does not exceed the threshold level until the switch SW2 is turned on, and hence, blur prevention is required during exposure (when this embodiment is applied to a video camera, this control to be executed during exposure is similarly performed during an image recording operation), as shown in FIG. 10. In this case as well, blur prevention is turned on from the middle of the exposure operation. When the correction optical system abruptly moves from a zero position to a target position from the blur prevention ON timing, and starts blur prevention, a shift δ is generated, as shown in A of FIG. 11. Since this shift is large, it is recorded as a double-line blur on an imaging plane. However, the blur prevention input discrimination means 15 connects the switch 16a to the terminal 16c for the period $t_1$' when the switch SW2 is ON and the blur prevention discriminator 112 does not generate any output (a period C in FIG. 10). Therefore, when blur prevention is turned on during exposure, since the correction optical system starts a continuous driving operation from its center, as indicated by a solid curve 21' in FIG. 11, the double-line blur caused by the shift δ can be prevented.

As described above, in the apparatus of this embodiment, since the blur prevention ON/OFF state is automatically discriminated by the camera, no load is imposed on a photographer, and problems expected to occur when blur prevention is turned off and on during exposure can be avoided.

The reason why the output from the blur amount discriminator 13 is continued over the period $t_2$ or longer by the timer 1 (18) after the blur amount discriminator 13 generates an output is that the blur angular velocity output shown in FIG. 8 changes in an alternate manner, and the necessity/unnecessity of blur prevention frequently alternates if the timer 1 (18) is not arranged In FIGS. 5A and 5B, the system arrangement is designed to perform blur prevention when the switch SW2 is turned on. Alternatively, blur prevention may be performed when the switch SW1 is turned on and the blur prevention discriminator 112 generates an output.

In an apparatus of a type which starts blur prevention from when the switch SW1 is turned on according to a modification of the first embodiment, if the blur prevention function is controlled to be automatically turned off during blur prevention, the blur prevention function may be immediately turned off when the blur angular velocity becomes equal to or smaller than a threshold level in a situation wherein the switch SW1 is ON but the switch SW2 is OFF (i.e., during blur prevention when no exposure is performed). On the other hand, during exposure in response to the ON operation of the switch SW2, the blur prevention may be continued until the driving position of the correction optical system falls within the predetermined stop range as in the first embodiment, and may be turned off when the driving position falls within the predetermined stop range.

In the apparatus of the same type, in a situation wherein the switch SW1 is ON but the switch SW2 is OFF, blur prevention ON/OFF control may be performed in correspondence with a blur prevention automatic ON/OFF function. On the other hand, when an exposure operation is performed in response to the ON operation of the switch SW2, even if the blur prevention function must be turned off depending on the blur prevention automatic ON/OFF function, this OFF operation need not always be accepted, i.e., the blur prevention function may be continued up to the end of exposure.

Furthermore, in the apparatus of the same type, when the switch SW1 is ON but the switch SW2 is OFF, blur prevention ON/OFF control may be performed in correspondence with a blur prevention automatic ON/OFF function. On the other hand, even when the blur prevention function must be turned off depending on the blur prevention automatic ON/OFF function at the beginning of exposure, the blur prevention function may be forcibly turned on from the beginning of exposure, and may be kept in an ON state during exposure. In this manner, a case can be coped with beforehand wherein a blur prevention function unnecessary state changes to a blur prevention necessary state during exposure.

In the first embodiment, when the correction optical system falls within a predetermined range, blur prevention is stopped to prevent an abrupt operation of the correction optical system. As another method, the correction optical system may be gradually moved from a position where the correction optical system is located when a blur prevention stop condition is satisfied to a stop position, and when the correction optical system has reached the stop position, the blur prevention may be stopped.

In the above-mentioned apparatus of the type which starts blur prevention from when the switch SW1 is turned on, when the blur prevention stop condition is satisfied during exposure, the other method described above may be applied in place of stopping of the blur prevention to prevent an abrupt operation of the correction optical system when the correction optical system falls within the predetermined range.

<Second Embodiment>

FIGS. 12A and 12B show a block diagram of the second embodiment of the present invention. Since the same reference numerals in FIGS. 12A and 12B denote the same blocks as in FIGS. 5A and 5B, a detailed description thereof will be omitted. Note that a blur prevention mechanism of this embodiment is the same as that shown in FIGS. 1 to 4. The difference between this embodiment and the embodiment shown in FIGS. 5A and 5B is that when the hand shake is too large, blur prevention is not performed, and a blur prevention impossible state is displayed and recorded.

For this purpose, in the arrangement shown in FIGS. 12A and 12B, the output from the angular velocity sensor 11 is also input to a blur amount discriminator 2 (13'). A reference value (const2) to be compared in the blur amount discriminator 2 (13') is larger than the reference value in the blur amount discriminator 1 (13). When a blur angular velocity equal to or larger than this reference value is generated, the blur amount discriminator 2 (13') generates an output. More specifically, the discriminator 2 (13') generates an output only when a large blur is generated. The discriminator 2 (13') supplies its output to a timer 2 (18'), and the output is continuously output for the period $t_2$. The output from the discriminator 2 is supplied to a blur prevention discriminator 2 (112'). When the blur prevention discriminator 2 (112') determines based on the lens focal length and the shutter speed at that time that an image blur cannot be corrected by blur prevention, it generates and output, and the output is supplied to a blur prevention impossible indicator 41 to display a blur prevention impossible state.

At this time, the blur prevention discriminator 1 (112) also generates an output, and attempts to display a blur prevention state on the blur prevention indicator 120 and to turn on the correction optical system activation SW 121 (i.e., to connect the switch contact 121a to the terminal 121b). However, when the blur prevention discriminator 2 (112') generates an output, a switch contact 42a of a display changeover means 42 is disconnected from a terminal 42b, and the blur prevention indicator 120 does not perform a display. On the other hand, the output from the blur prevention discriminator 2 (112') is also input to a blur prevention suspension means 44. In response to this input, a switch contact 44a is disconnected from a terminal 44b, and the correction optical system activation SW 121 is prohibited from being operated by the blur prevention continuation means 117. In other words, blur prevention is not performed.

The output from the blur prevention discriminator 2 (112') is also input to a blur prevention impossible recording means 43, and records data indicating that blur prevention is impossible on a data pack or a film.

When blur prevention is performed while a large blur is generated, not only a sufficient blur prevention effect cannot be obtained since the driving range of the correction optical system is limited, but also the service life of the power supply is considerably shortened since the correction optical system is driven at high speed with a large amplitude. Therefore, in this embodiment, blur prevention is prohibited when the blur is large.

Since a blur prevention impossible display is made when the blur is large like in this embodiment, if a photographer recovers a camera to a blur prevention possible state by re-holding the camera or hy shortening the focal length, the camera performs self blur prevention. Since then, a picture free from an image blur can be taken.

<Third Embodiment>

FIGS. 13A and 13B show the third embodiment of the present invention. The differences from the embodiment shown in FIGS. 12A and 12B reside in three points, i.e., a different discrimination mode of necessity/unnecessity of blur prevention is adopted, a blur prevention possible display is performed, and a photographer can arbitrarily stop blur prevention.

Referring to FIGS. 13A and 13B, a blur amount detector 51 generates an output obtained by converting the output from the angular velocity sensor 11 into an absolute value, and smoothing the absolute value, and supplies the output to blur amount discriminators 1 and 2 (52a and 52b). The blur amount discriminators 1 and 2 respectively determine first and second reference values on the basis of shutter speed information and lens focal length information from the exposure preparation means 14 and the zoom position detector 118. Note that the first reference value means a value which does not cause an image blur without blur prevention if the blur is smaller than this reference value, and the second reference value means a value which makes blur correction impossible when the blur is larger than this reference value. When the output from the blur amount detector 51 is equal to or larger than the first reference value, blur prevention is performed as in the first embodiment. On the other hand, when the output from the blur amount detector 51 is equal to or larger than the second reference value, the output from the blur amount discriminator 2 (52b) is input to the blur prevention suspension means 44 as in the second embodiment, thereby turning off the correction optical system activation SW 121. In other words, blur prevention is not performed. The output from the blur amount discriminator 2 (52b) is also input to a blur prevention possible indicator 53 via a NAND gate 55. Therefore, when the blur amount discriminator 2 (52b) does not generate any output, since a blur prevention possible display is made, a photographer can keep his or her mind on the photographing operation.

A forced blur prevention OFF means 54 disconnects the switch of the blur prevention suspension means 44 by an operation of a photographer When the means 54 generates an output, blur prevention is not performed.

For example, when a panning operation is performed, i.e., a photographing operation 1s performed while panning the camera, the forced blur prevention OFF means 54 is used. Note that an operation member of the forced blur prevention OFF means 54 is normally covered by, e.g., a lid, so that many operation members do not rest heavily on the photographer's mind.

<Fourth Embodiment>

Figure 14B:
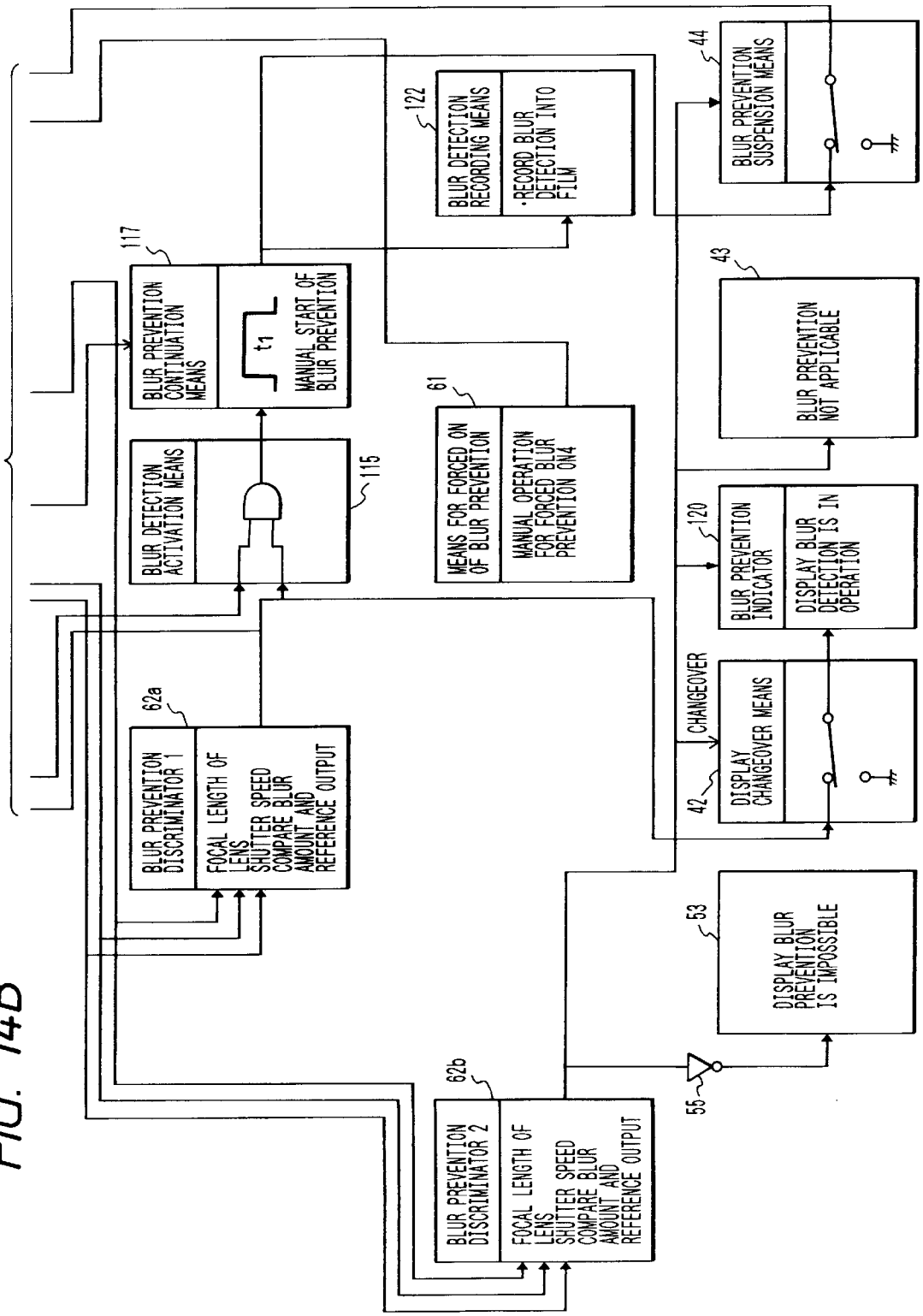
FIG. 14 is comprised of FIGS. 14A and 14B showing block diagrams of a camera blur prevention control apparatus according to the fourth embodiment of the present invention.

FIGS. 14A and 14B show the fourth embodiment of the present invention. The difference from the second and third embodiments is that blur prevention discrimination is made based on information (the shutter speed and lens focal length) from the blur prevention preparation means 114 and the exposure means 116 without using the output from the angular velocity sensor 11. For example, when the shutter speed is 1/60 sec, and the focal length is 300 mm, a product of these values is 5, and is larger than a first reference output "1". For this reason, a blur prevention discriminator 1 (62a) generates an output to perform blur prevention. On the other hand, since the product is smaller than a second reference output "10", a blur prevention discriminator 2 (62b) does not generate any output, and blur prevention is not suspended. If the shutter speed is 1/10 sec, and the focal length is 300 mm, since a product of these values becomes 30, the blur prevention discriminator 2 (62b) generates an output to suspend blur prevention since it is determined that the blur is large, and to prohibit the blur prevention possible indicator 53 from performing a display.

With this arrangement, although blur prevention discrimination cannot be achieved so precisely (depending on the blur amount of a photographer), a system with a simpler arrangement can be constituted. A forced blur prevention ON means 61 is a means for forcibly performing blur prevention by an operation of a photographer even when the blur prevention indicator 120 does not perform a display, and the blur is not so serious, and is utilized for a photographer who may cause a large hand shake or when a photographing operation is requested to another photographer (blur is unknown).

As described above, according to the camera blur prevention control apparatus of each of the above embodiments of the present invention, since the blur prevention function is automatically turned on when deterioration of an image due to a hand shake may occur, a blur prevention camera, which does not require a photographer to perform a troublesome blur prevention switch operation, and can be used by a photographer who cannot decide whether or not the blur prevention function is to be turned on, can be provided. In addition, even when the blur prevention function must be turned on or off during exposure, since the driving position of the correction optical system at that time is changed or since the blur prevention is continued until the driving position falls within a predetermined range, a blurred picture such as a double-line blur picture can be avoided from being taken.

Furthermore, since the means for displaying a message indicating that blur prevention is impossible to perform due to a large blur or the means for displaying a message indicating that blur prevention is possible to perform since the blur is not serious is arranged, a photographer can keep his or her mind on the photographing operation by confirming such a message.

According to the present invention, a camera comprises image blur compensation mode setting means for determining an active or inactive state of an image blur compensation means in accordance with a photographing condition which is set by photographing condition setting means for setting a photographing condition used upon recording of an object image on a film or an image pickup element, and image blur mode changing means for changing the image blur compensation mode set by the image blur compensation mode setting means, wherein the camera automatically determines an optimal image blur compensation mode for the set photographing condition, and a photographer can change the image blur compensation mode as needed.

Further variations of the blur prevention automatic ON/OFF function described in each of the above embodiments will be explained in the following embodiments.

<Fifth Embodiment>

The present invention will be described in detail below with reference to its illustrated embodiments.

FIGS. 15 to 19 are views according to the fifth embodiment of the present invention, and FIGS. 5A and 5B show the arrangement of principal part of this embodiment.

Referring to FIGS. 5A and 5B, a camera main body CMR has a lens LNS which is detachable from the camera main body CMR.

The arrangement of the camera main body CMR side will be explained below.

A camera microcomputer CCPU is a one-chip microcomputer having a ROM, a RAM, and A/D and D/A conversion functions, and performs a series of operations of the camera such as automatic exposure control (AE), automatic focusing (AF), film wind-up (drive) control, and the like in accordance with a sequence program of the camera stored in the ROM. For this purpose, the camera microcomputer CCPU controls the operations of the respective circuits and the lens by communicating with peripheral circuits in the camera main body CMR and the lens LNS.

A mount portion for coupling the camera main body CMR and the lens LNS is provided with four pairs of connection terminals. A camera power supply BAT supplies a power supply voltage to the circuits and actuators in the camera, and also supplies a power supply voltage to the lens LNS via a line VL. A line DCL is used for transmitting a signal from the camera microcomputer CCPU to a lens microcomputer LCPU (to be described later), and a line DLC is used for transmitting a signal from the lens microcomputer LCPU to the camera microcomputer CCPU. The camera CMR controls the lens LNS via these two lines. In addition, the ground terminals of the camera and the lens are connected via a line GND.

A shutter SH is constituted by light-shielding blades and a blade driving control unit, and is arranged in front of a photosensitive film or an imaging plane FP where an image pickup element is arranged. A photometry means ABSNS measures an object brightness, a focus detection means AFSNS detects the focus state of an object image, and a winding (drive) means DR performs a film wind operation and a shutter charge operation.

A main switch SWMN is connected to the microcomputer CCPU. When the switch SWMN is turned on, the microcomputer CCPU permits execution of a predetermined program associated with a photographing operation. Switches SW1 and SW2 are interlocked with a release button of the camera, and are respectively turned on at the first and second stroke positions of the release button.

A photography mode selection switch SWMOD is also connected to the microcomputer CCPU. When a photographer sets this switch SWMOD at a predetermined position, his or her required photography mode is set, and an AE mode, an AF mode, a film feed mode, and an image blur compensation mode suitable for the selected photography mode are selected. An image blur compensation changeover switch SWIS is connected to the microcomputer CCPU, and is used for changing the image blur compensation mode determined upon selection of the photography mode selection switch SWMOD.

The above-mentioned two switches SWMOD and SWIS are the most characteristic features in this embodiment, and their effects will be described in detail later.

An up-down switch SWUD is also connected to the microcomputer CCPU. A display means DISP is constituted by a liquid crystal panel and its driving circuit, and displays various kinds of information such as the states of various modes selected by the photography mode selection switch SWMOD, the shutter speed, aperture value, film sensitivity, and the like. A light-emitting diode LEDIS is used for informing a photographer that the image blur compensation is active, and is arranged in a finder of the camera CMR.

The arrangement of the lens LNS side will be explained below.

The lens microcomputer LCPU is a microcomputer having a ROM, a RAM, and A/D and D/A conversion functions as in the camera microcomputer CCPU, and performs driving control of a focusing motor, a zooming motor, an aperture control motor, and an image blur compensation actuator (to be described later) in accordance with instructions sent from the camera microcomputer CCPU via the signal line DCL. Also, the microcomputer LCPU transmits various operation states of the lens and parameters inherent to the lens to the camera microcomputer CCPU via the signal line DLC.

Each of first, second, and third lens groups L1, L2, and L3 consists of a plurality of lenses, and these lens groups constitute a photographing optical system with a zoom function. The photographing optical system forms an object image on the imaging plane FP of the camera main body CMR.

A focusing motor FMTR performs a focusing operation by moving the first lens group L1 in the optical axis direction. A focus encoder ENCF detects the position of the first lens group L1, i.e., information corresponding to an object distance, and supplies the detected information to the microcomputer LCPU. A zooming motor ZMTR performs a zooming operation by moving the first and second lens groups L1 and L2 in the optical axis direction while maintaining a predetermined relationship therebetween. A zoom encoder ENCZ detects the zoom state, and transmits the detected state to the microcomputer LCPU. A stepping motor DMTR is used for controlling an aperture.

A hand shake sensor GR comprises, e.g., a vibration gyro. The sensor GR detects angular displacements in the vertical (pitch) and horizontal (Yaw) directions of the camera, and transits the detection results to the microcomputer LCPU.

An actuator IACT drives the second lens group L2, which is supported by a mechanism (not shown) to be independently shifted in two-dimensional directions in a plane perpendicular to the photographing optical. axis, in these two directions so as to achieve image blur compensation. When the lens group L2 is shifted, an image on the imaging plane FP is also shifted. Therefore, by shifting the second lens group L2 in correspondence with hand shake information from the hand shake sensor GR, an image blur caused by a hand shake can be compensated.

Since the image blur compensation is performed independently in the two directions, i.e., pitch and yaw directions, two sets of the hand shake sensors GR and the image blur compensation actuators IACT are arranged in correspondence with pitch and yaw compensations.

Figure 16:
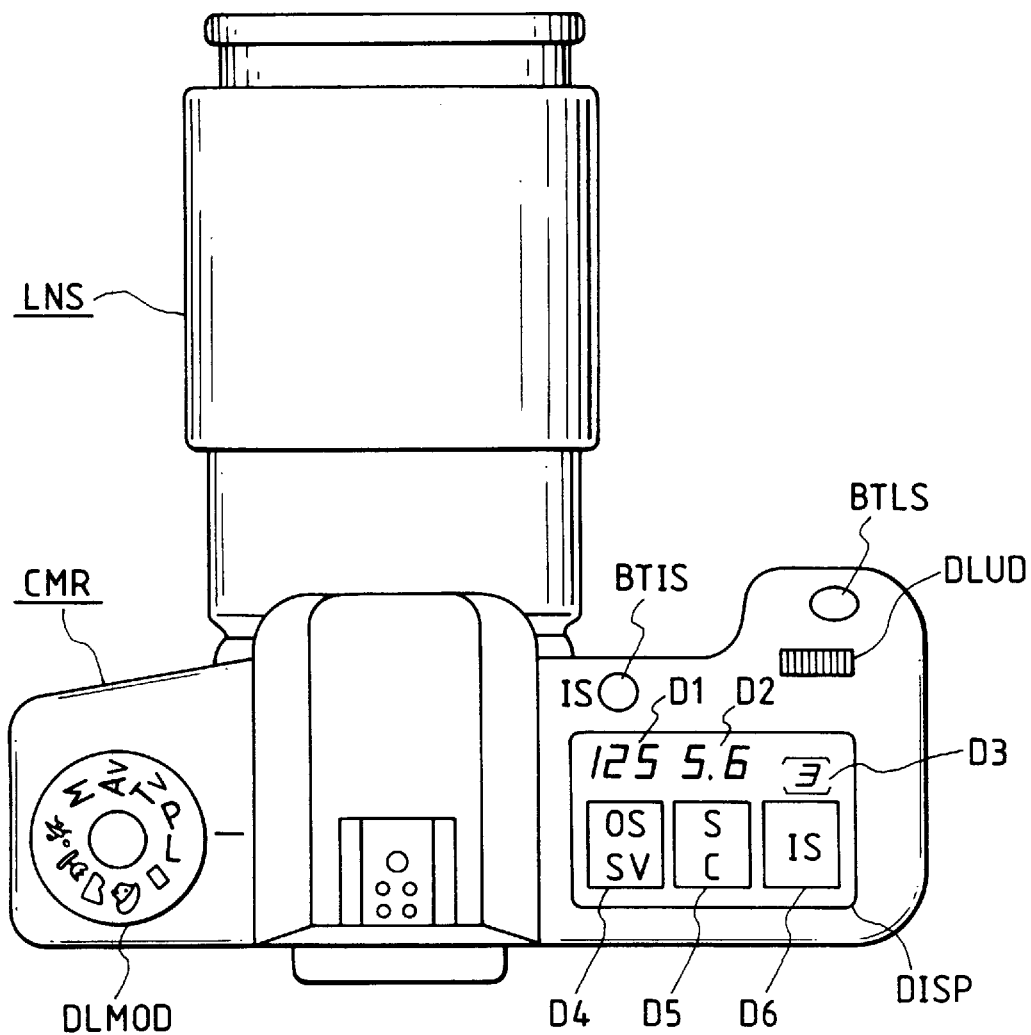
FIG. 16 is a top view of a camera in the fifth embodiment of the present invention.

FIG. 16 shows operation members and display means on a single-lens reflex camera with the above-mentioned arrangement.

A mode dial DLMOD for selecting a photography mode is arranged on the upper surface at the left side of the camera main body CMR. The mode dial DLMOD is coupled to the main switch SWMN and the photography mode selection switch SWMOD in FIG. 15. At an L (lock) position shown in FIG. 16, the main switch SWMN is turned off, and the camera operation is prohibited. When the dial DLMOD is set at a position other than L, the main switch SWMN is turned on, and the photography mode selection switch SWMOD corresponding to the dial index is turned on, thus permitting the start of a photographing preparation operation in a predetermined photography mode.

Figure 15:
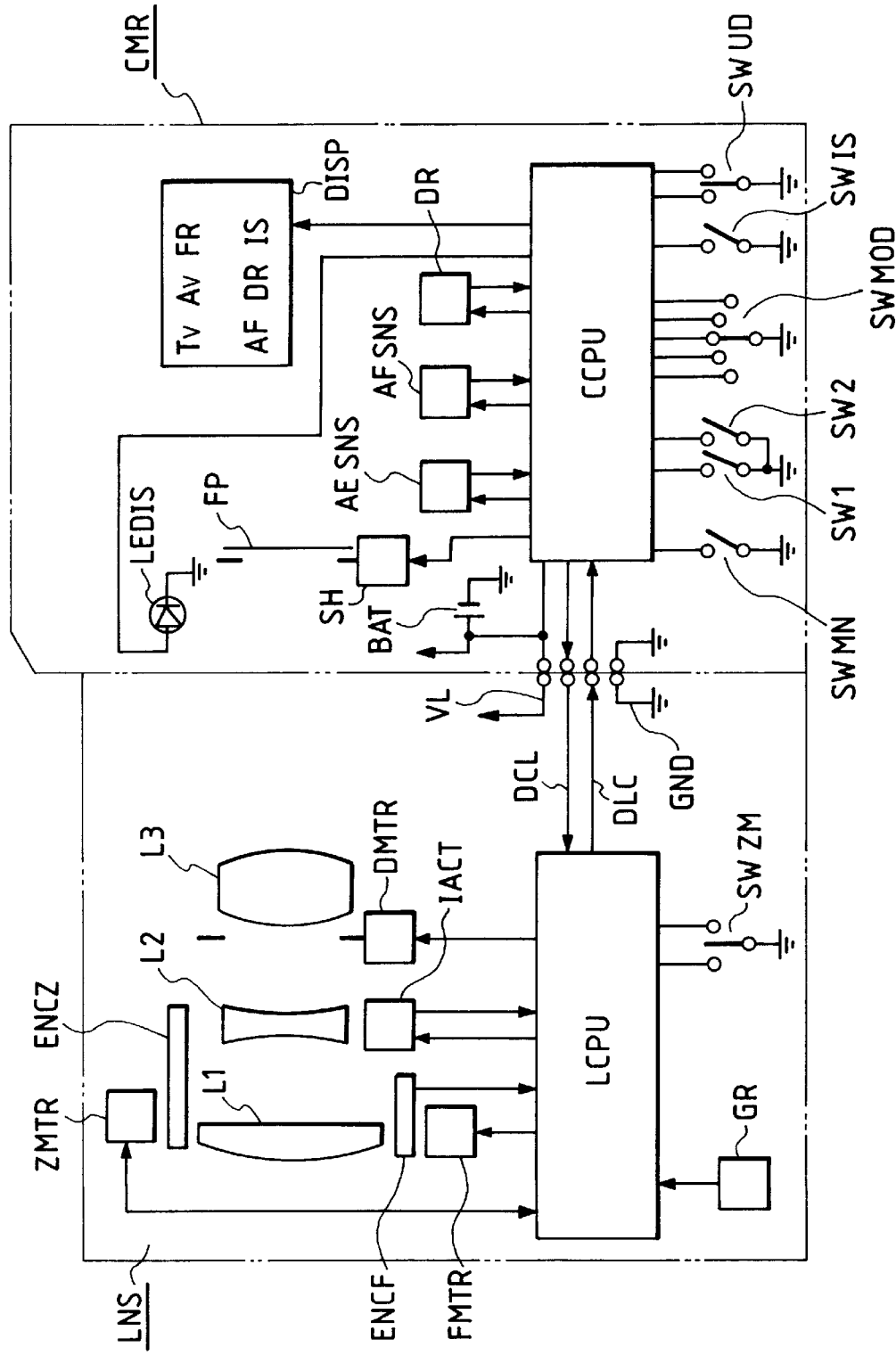
FIG. 15 is a block diagram showing a camera with an image blur compensation function, which is used in each of the fifth to eighth embodiments of the present invention.

A release button BTLS is arranged on the upper surface at the right side of the camera main body CMR. When the release button BTLS is depressed to the first stroke position, the switch SW1 shown in FIG. 15 is turned on; when the button BTLS is depressed to the second stroke position, the switch SW2 is turned on. An image blur compensation changeover button BTIS is also arranged on the upper surface at the right side of the camera main body CMR. When the button BTIS is depressed, the image blur compensation changeover switch SWIS shown in FIG. 15 is turned on. An up-down dial DLUD is arranged near the release button BTLS. Upon clockwise or counterclockwise rotation of the up-down dial DLUD, a terminal, in the predetermined direction, of the up-down switch SWUD shown in FIG. 15 is turned on to change an operation condition.

The display means DISP, which is also shown in FIG. 15, has a display portion D1 for displaying a shutter speed, a display portion D2 for displaying an aperture value, a display portion D3 for displaying the number of photographed frames, an AF mode display portion D4, a drive mode display portion D5, and an image blur compensation mode display portion D6. On the AF mode display portion D4, a one-shot AF mode (OS) in which AF is not re-done once an in-focus state is attained, and a servo AF mode (SV) in which AF is repetitively performed are displayed. On the drive mode display portion D5, a single photography mode (S) and a continuous photography mode (C) are displayed. On the image blur compensation mode display portion D6, "IS" is displayed when the image blur compensation mode is active; and "IS" is not displayed when the image blur compensation mode is inactive.

FIG. 17 shows combinations of the modes, i.e., the AE mode, AF mode, drive mode, and image blur compensation mode, selected by the camera in correspondence with the set position of the mode dial DLMOD shown in FIG. 16.

For example, when the mode dial DLMOD is set at the position of a "full automatic" mode, the following modes are selected as a photography mode. That is, a program AE mode is selected as the AE mode, the one-shot and servo AF modes are automatically changed over in correspondence with the movement, in the optical axis direction, of an object as the AF mode, the single photography mode is selected as the drive mode, and the image blur compensation mode is ON.

The operation method and effects of the camera will be explained below with reference to FIGS. 15 to 17.

When a photographer sets the mode dial DLMOD shown in FIG. 16 at a position other than L, the camera microcomputer CCPU reads the states of the switches SWMN and SWMOD in FIG. 15, and stores a photography mode number described in the leftmost column in FIG. 17 in a predetermined register. Subsequently, the microcomputer CCPU selects and sets the AE mode, AF mode, drive mode, and image blur compensation mode, as shown in FIG. 17, in accordance with the set photography mode number and a program stored in the ROM.

Note that the AF and drive modes are as has been described above. On the other hand, when the image blur compensation mode is ON, the image blur compensation is active; when the mode is OFF, the image blur compensation is inactive.

When the release button BTLS is depressed to the first stoke position in this state, the photometry operation, exposure condition setting operation, AF operation, and image blur compensation operation are performed in the corresponding predetermined modes. When the release button BTLS is depressed to the second stroke position, the exposure operation and the drive operation are performed.

When the image blur compensation changeover button BTIS is depressed once while the release button BTLS is not operated, the image blur compensation mode is reversed. For example, when the photography mode is a manual mode, the initial setting state of the image blur compensation mode is "inactive" (OFF). However, when the image blur compensation changeover button BTIS is depressed, the camera microcomputer CCPU detects this operation, and activates (turns on) the image blur compensation mode. When the button BTIS is depressed once again, the image blur compensation mode is restored to the inactive mode, and this mode reversal is repeated upon operation of the button BTIS.

With the above-mentioned operation, when a photographer selects a photography mode of the camera, the camera selects an image blur compensation mode (ON/OFF) suitable for the selected mode. For this reason, an image blur can be effectively suppressed even under a condition in which an image blur may occur. In addition, when the photographer wants to change the currently set image blur compensation mode, he or she can easily change the mode by operating one member (in this embodiment, the image blur compensation changeover button BTIS, as described above).

Figure 18:
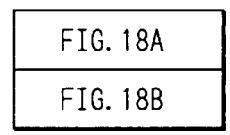
FIG. 18 is comprised of FIGS. 18A and 18B showing flow charts of the operation of a camera microcomputer according to the fifth embodiment of the present invention.
Figure 18A:
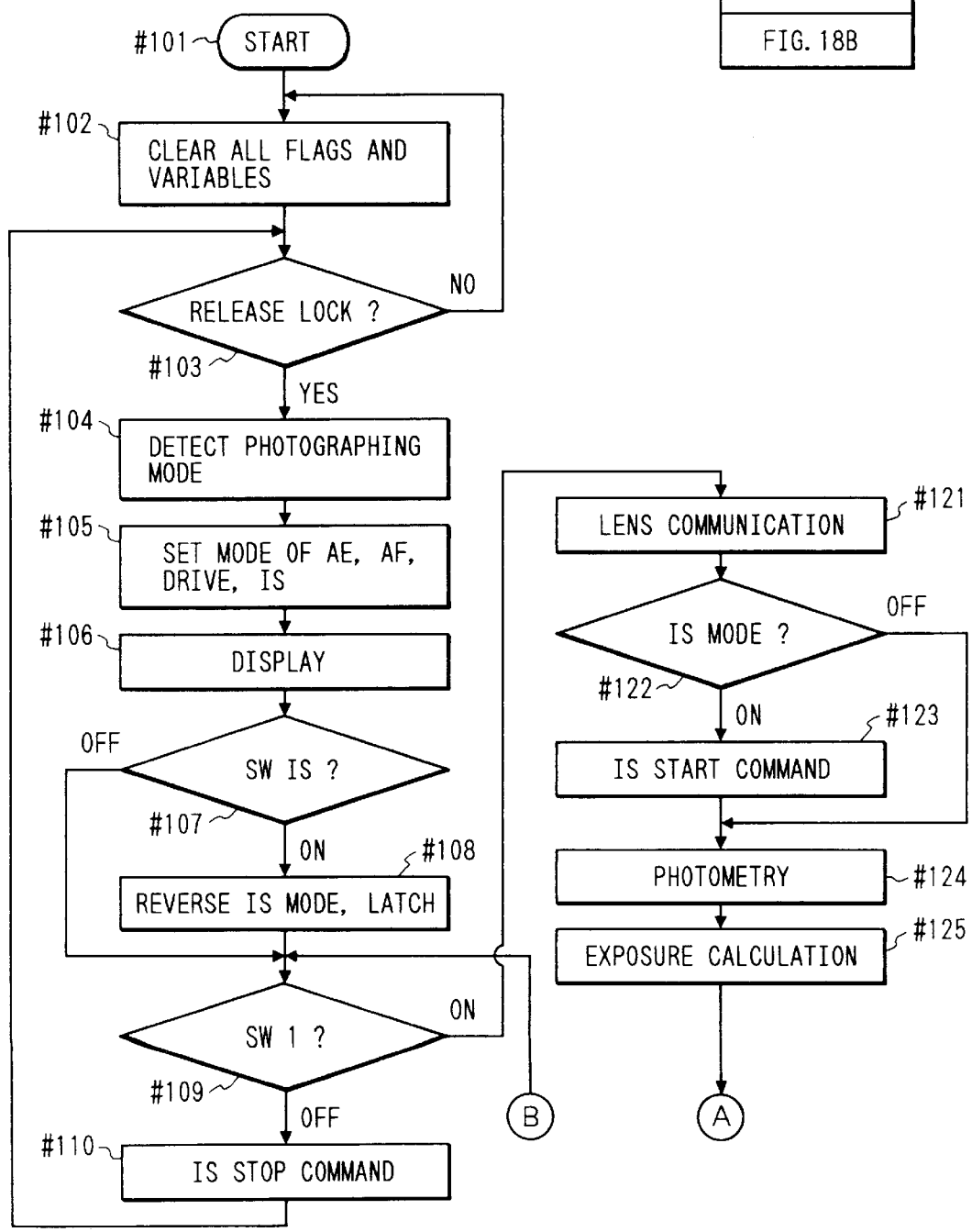
Figure 18B:
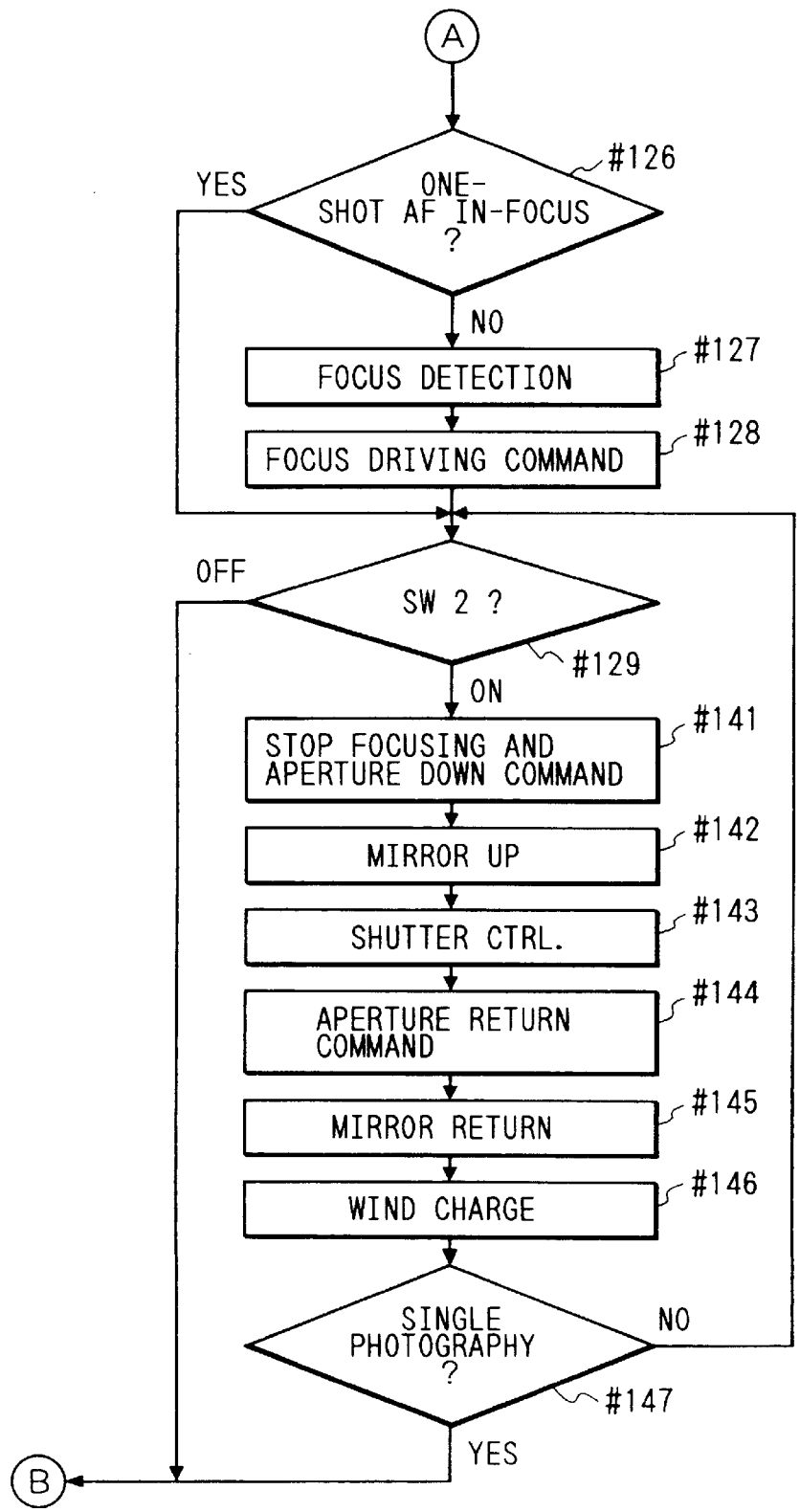
Figure 19:
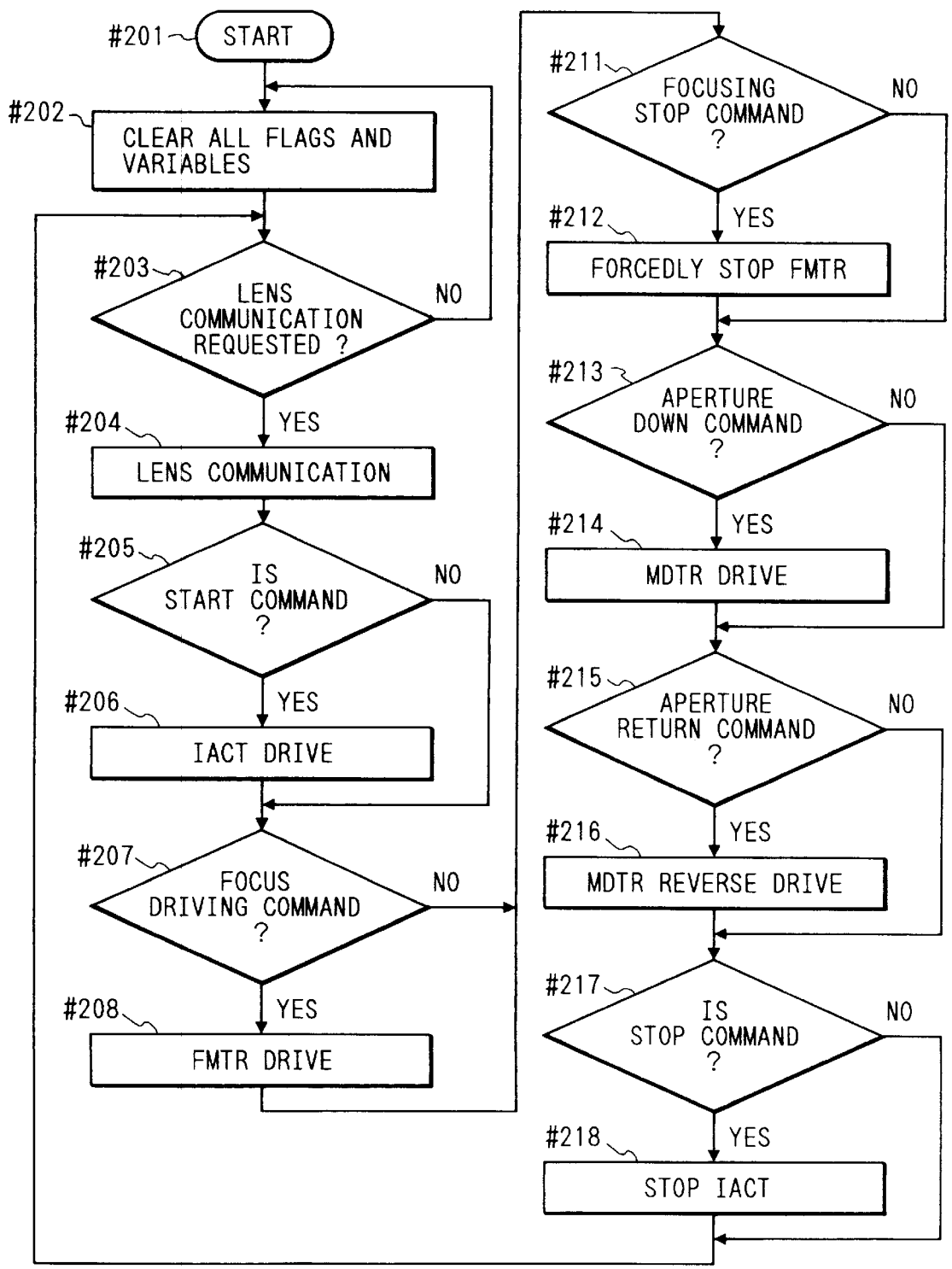
FIG. 19 is a flow chart showing the operation of a lens microcomputer according to the fifth embodiment of the present invention.

FIGS. 18A, 18B and 19 are flow charts showing the operations of the camera main body CMR and the lens LNS for realizing the above-mentioned operations. The operations of the camera main body CMR will be described first below with reference to FIGS. 18A and 18B.

In step 102 after step 101, all control flags and variables set in the RAM in the camera microcomputer CCPU are cleared and initialized. In step 103, the State of the main switch SWMN is detected to check if the lock state of the mode dial DLMOD is released. If NO in step 103, the flow returns to step 102; otherwise, the flow advances to step 104.

In step 104, the state of the photography mode selection switch SWMOD is detected to recognize the selected photography mode, and the recognized photography mode number is stored in a predetermined register. In step 105, the AE mode, AF mode, drive mode, and image blur compensation mode are selected and set in correspondence with the mode set in step 104. In step 106, the modes set in steps 104 and 105 are displayed on the display means DISP.

In step 107, the state of the image blur compensation changeover switch SWIS is detected. If the switch SWIS is OFF, the flow jumps to step 109; otherwise, the flow advances to step 108 to reverse the image blur compensation mode, and the reversed state is latched. In step 109, the state of the switch SW1 is detected. If the switch SW1 is OFF, the flow advances to step 110 to transmit a command for stopping the image blur compensation to the lens LNS. This command serves as a command for stopping the operation when the image blur compensation mechanism is active, or serves as a command for maintaining the current state when the image blur compensation mechanism is inactive. The flow then returns to step 103.

While the switch SW1 is OFF, steps 103 to 110 are repetitively executed. In this case, if the image blur compensation mode is reversed and latched in step 108, since the latched operation is effective when the flow returns to step 105 later, the image blur compensation mode set in step 105 is ignored. However, if it is detected in step 107 again that the switch SWIS is ON, the image blur compensation mode is reversed again and latched in step 109.

If it is determined in step 109 that the switch SW1 is ON, the flow jumps to step 121. In step 121, the camera microcomputer CCPU communicates with the lens microcomputer LCPU to receive information such as the focal length, AF sensitivity, full-open f-number, and the like of the lens. In step 122, the image blur compensation mode set in step 105 or 108 is checked. If the mode is OFF, the flow jumps to step 124; otherwise, the flow advances to step 123.

In step 123, a command for starting image blur compensation is transmitted to the lens LNS. This command serves as a command for starting the operation when the image blur compensation mechanism is inactive, or serves as a command for maintaining the current state when the image blur compensation mechanism is active. In step 124, the photometry means AESNS in FIG. 15 measures an object luminance. In step 125, a combination of the shutter speed and aperture value are calculated in correspondence with the photometry result and the AE mode set in step 105.

In step 126, an AF in-focus history is checked. If an in-focus state has already been achieved in the one-shot AF mode, the flow jumps to step 129 without executing the AF operation; otherwise, the flow advances to step 127.

In step 127, the focus detection means AFSNS in FIG. 15 performs focus detection, and calculates a defocus amount and a lens driving amount. In step 128, the lens driving amount is transmitted to the lens microcomputer LCPU, thus issuing a focus driving command.

In step 129, the state of the switch SW2 is detected. If the switch SW2 is OFF, the flow returns to step 109, and steps 121 to 129 are repetitively. executed.

If it is determined in step 129 that the switch SW2 is ON, an exposure sequence in step 141 and subsequent steps is executed.

More specifically, in step 141, the camera microcomputer CCPU transmits a stop command for stopping the focusing operation and an aperture down command based on the aperture value calculated in step 125 to the lens microcomputer LCPU. In step 142, a known mirror up mechanism (not shown) is driven to retract a mirror. In step 143, the shutter SH is controlled on the basis of the shutter speed calculated in step 125. In step 144, the camera microcomputer CCPU transmits an aperture return command to the lens microcomputer LCPU. In step 145, a mirror return operation is performed. In step 146, the drive means DR in FIG. 15 is driven to perform a film feed operation and a shutter charge operation.

In step 147, the drive mode is checked. If the drive mode is the single photography mode, the flow returns to step 109. In this state, if the switch SW1 is kept ON, the operations in step 121 and the subsequent steps are executed again. On the other hand, if the drive mode is the continuous photography mode, the flow returns to step 129. In this state, if the switch SW2 is kept ON, the operations in step 141 and subsequent steps are executed to perform continuous photographing operations.

The operation of the lens microcomputer LCPU incorporated in the lens LNS will be described below with reference to the flow chart in FIG. 19.

Referring to FIG. 15, when the mode dial DLMOD is turned from the lock position to another position, a power supply voltage is supplied from the camera power supply BAT to the respective circuits in the lens via the line VL, and the lens microcomputer LCPU starts execution of a program in step 201 and subsequent steps.

In step 202, all control flags and variables set in the RAM in the lens microcomputer LCPU are initialized and cleared. In step 203, it is checked if the lens communication command (corresponding to step 121 in FIG. 18A) has been received from the camera main body CMR. If YES in step 203, the flow advances to step 204 to transmit data inherent to the lens stored in the lens microcomputer LCPU and the operation states of the actuators. On the other hand, if NO in step 203, i.e., if the switch SW1 is OFF, the flow returns to step 202, and the control stands by in an initial state.

In step 205, it is checked if the image blur compensation start command (corresponding to step 123 in FIG. 18A) has been received from the camera main body CMR. If YES in step 205, the flow advances to step 206, and image blur compensation is performed by driving the image blur compensation actuator IACT. On the other hand, if NO in step 205, the flow jumps to step 207.

In step 207, it is checked if the focusing driving command (corresponding to step 128 in FIG. 18B) has been received from the camera. If YES in step 207, the flow advances to step 208 to drive the focusing motor FMTR. On the other hand, if NO in step 207, the flow jumps to step 211.

In step 211, it is checked if the focusing stop command (corresponding to step 141 in FIG. 18B) has been received from the camera main body CMR. If YES in step 211, the flow advances to step 212 to forcedly stop the focusing motor FMTR. On the other hand, if NO in step 211, the flow jumps to step 213.

In step 213, it is checked if the aperture down command (corresponding to step 141 in FIG. 18B) has been received from the camera. If YES in step 213, the flow advances to step 214 to drive the aperture control stepping motor DMTR. On the other hand, if NO in step 213, the flow jumps to step 215.

In step 215, it is checked if the aperture return command (corresponding to step 144 in FIG. 18B) has been received from the camera. If YES in step 215, the flow advances to step 216 to drive the aperture control stepping motor DMTR in the reverse direction, thereby returning the aperture to a full-open state. On the other hand, if NO in step 215, the flow jumps to step 217.

In step 217, it is checked if the image blur compensation stop command (corresponding to step 110 in FIG. 18A) has been received. If YES in step 217, the flow advances to step 218 to return the image blur compensation actuator IACT to the origin, and then stop the actuator. If NO in step 217, the flow returns to step 203.

According to the above-mentioned flows, the camera automatically selects the image blur compensation mode (i.e., whether image blur compensation is performed or not) in correspondence with the photography mode set by a photographer, and the photographer can change the selected image blur compensation mode as needed.

<Sixth Embodiment>

In the fifth embodiment described above, the is camera automatically discriminates and sets an image blur compensation mode (ON/OFF) in correspondence with a selected photography mode, and a photographer can reverse the ON/OFF state of the image blur compensation mode by operating the image blur compensation changeover switch SWIS as needed.

On the other hand, in the sixth embodiment to be described below, the camera discriminates, independently of the photography mode, if an image blur exceeding an allowable amount is generated during exposure, and automatically changes over the ON/OFF state of the image blur compensation mode. In addition, the image blur compensation mode can be changed from an automatic changeover mode to an always ON or OFF mode by an operation of the switch SWIS by the photographer.

Figures 20, 25:
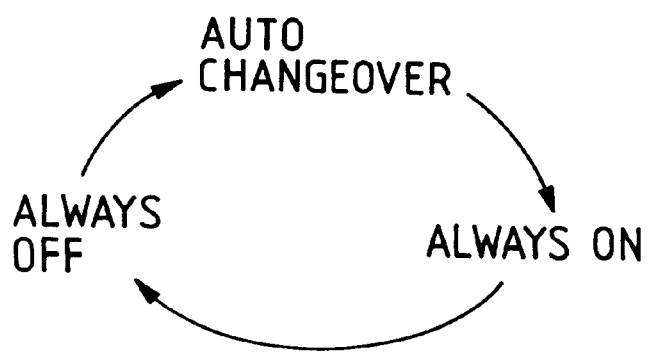
FIG. 20 is a table for explaining the operation of a camera in the sixth embodiment of the present invention.
FIG. 25 is a view for explaining the operation of the camera in the eighth embodiment of the present invention.

FIG. 20 shows the operations of the sixth embodiment. An image blur compensation flag ISFLG is set in the lens microcomputer LCPU. The flag ISFLG is classified into three states, and the control is made to set the following modes:

When ISFLG is "3n (n is 0 or a natural number)", the ON/OFF state of the image blur compensation is automatically changed over;

When ISFLG is "3n +1", the image blur compensation is always ON; and

When ISFLG is "3n +2", the image blur compensation is always OFF.

Figure 21:
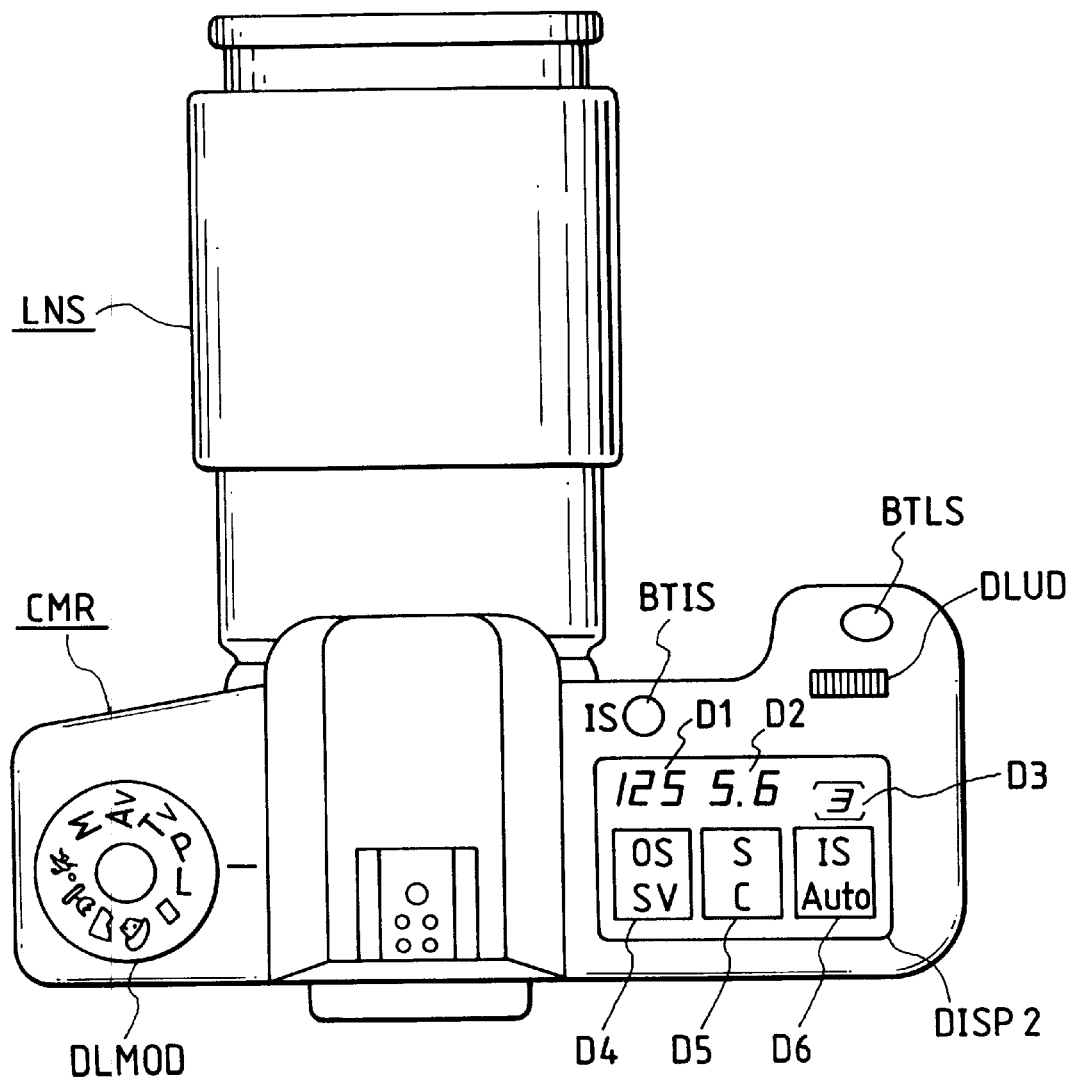
FIG. 21 is a top view of the camera in the sixth embodiment of the present invention.

FIG. 21 shows operation members and display means on a single-lens reflex camera according to the sixth embodiment of the present invention. The difference from the fifth embodiment is that the display means DISP and the image blur compensation mode display portion D6 in the fifth embodiment are respectively replaced by DISP2 and D26.

The operation method and effects of the camera of the sixth embodiment will be explained below with reference to FIGS. 20 and 21.

When the mode dial DLMOD is set at a position other than the lock position, the flag ISFLG in FIG. 20 is initialized to "0" independently of the photography mode, and the image blur compensation mode is set in an automatic changeover mode. Then, "ISAuto" is displayed on the display portion D26 in FIG. 21.

When the image blur compensation changeover button BTIS is depressed once, "1" is added to the flag ISFLG, the image blur compensation mode is set in an always ON mode, and "IS" is displayed on the display portion D26 When the button BTIS is depressed once again, "1" is further added to the flag ISFLG to yield "2", the image blur compensation mode is set in an always OFF mode, and no display is made on the display portion D26. When the button BTIS is depressed still another time, the image blur compensation mode is restored to the automatic changeover mode as an initial state. Thereafter, each time the button BITS is depressed, the image blur compensation mode is sequentllially changed over.

Even in the image blur compensation always ON mode, image blur compensation is actually performed only while the switch SW1 is ON upon depression of the release button BTLS to the first stroke position.

Figure 22B:
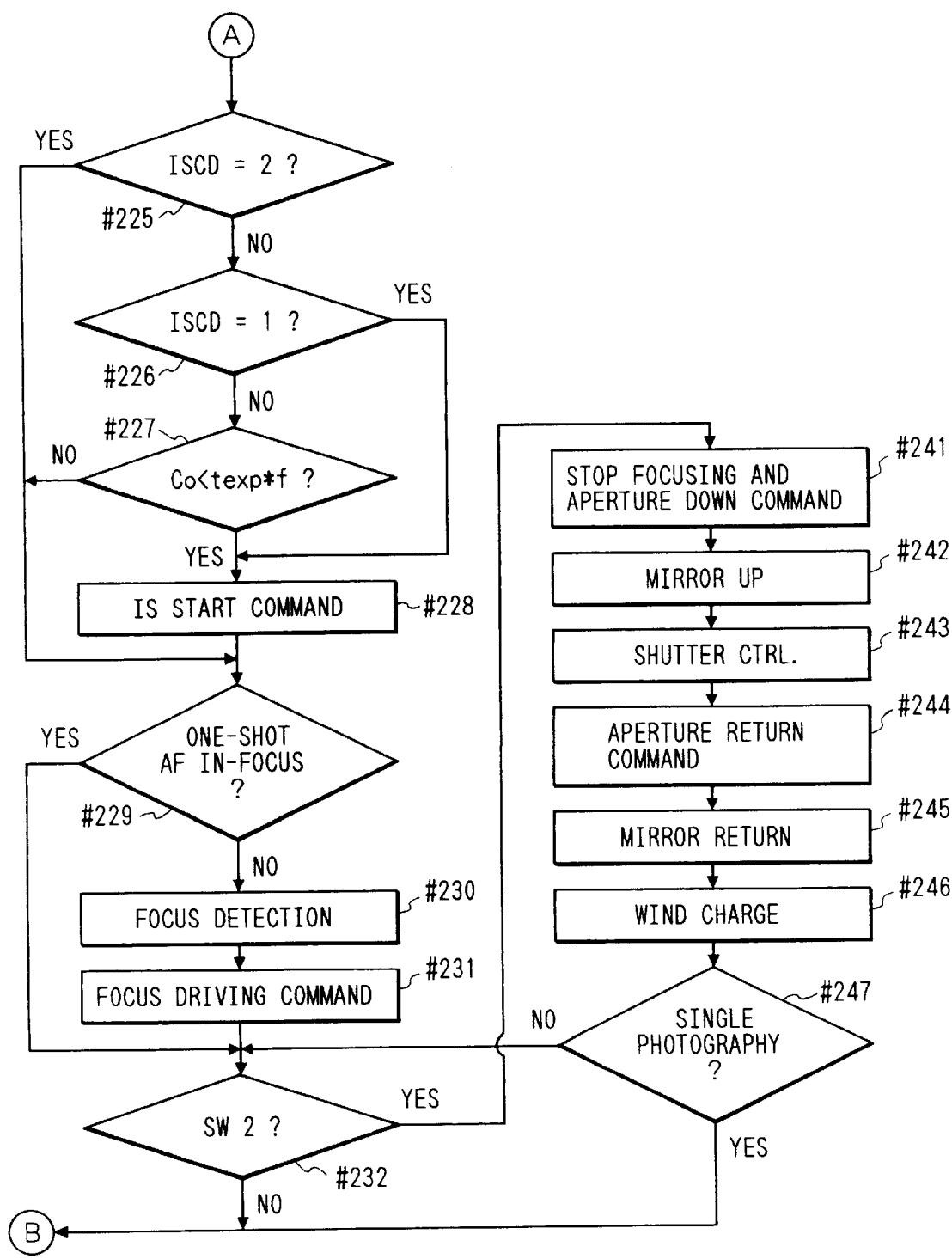
FIG. 22 is comprised of FIGS. 22A and 22B showing flow charts of the operation of a camera microcomputer according to the sixth embodiment of the present invention.

The operation of the camera microcomputer CCPU in the sixth embodiment will be described below with reference to the flow charts in FIGS. 22A and 22B.

In step 202 after step 201, all control flags and variables set in the RAM in the camera microcomputer CCPU are cleared and initialized. In step 203, the state of the main switch SWMN is detected to check if the lock state of the mode dial DLMOD is released. If NO in step 203, the flow returns to step 202; otherwise, the flow advances to step 204.

In step 204, the state of the photography mode selection switch SWMOD is detected to recognize the selected photography mode, and the recognized photography mode number is stored in a predetermined register. In step 205, the AE mode, AF mode, drive mode, and image blur compensation mode are selected and set in correspondence with the mode set in step 204.

Since the above-mentioned image blur compensation flag ISFLG is initialized to "O" in step 202, the image blur compensation mode is set in the automatic changeover mode according to FIG. 20 at that time.

In step 206, the modes set in steps 204 and 205 are displayed on the display means DisP2. In step 207, the state of the image blur compensation changeover switch SWIS is detected. If the switch SWIS is OFF, the flow jumps to step 209; otherwise, the flow advances to step 208 to add "1" to the image blur compensation flag ISFLG.

In step 209, the state of the switch SW1 is detected. If the switch SW1 is OFF, the flow advances to step 210 to transmit a command for stopping the image blur compensation to the lens LNS. This command serves as a command for stopping the operation when the image blur compensation mechanism is active, or serves as a command for maintaining the current state when the image blur compensation mechanism is inactive. Thereafter, the flow returns to step 203

While the switch SW1 is OFF, steps 203 to 210 are repetitively executed. In this case, if the flag ISFLG is updated in step 208, the updated image blur compensation mode is set when the flow returns to step 205 later, and subsequently, displayed data are updated in step 206.

If it is determined in step 209 that the switch SW1 is ON, the flow jumps to step 221. In step 221, the camera microcomputer CCPU communicates with the lens microcomputer LCPU to receive information such as the focal length, AF sensitivity, full-open f-number, and the like of the lens. In step 222, the photometry means AESNS measures an object luminance. In step 223, a combination of the shutter speed and aperture value are calculated in correspondence with the photometry result and the AE mode set in step 205.

In step 224, a code ISCD for discriminating whether or not image blur compensation is performed Is calculated by the following equation:

$$ISCD = ISFLG - 3*INT(ISFLG/3)$$

where ISFLG is the value set in step 208, and INT represents a calculation for converting a value into an integer. Thus, ISCD in the above equation represents the remainder obtained when ISFLG is divided with 3. More specifically, since ISCD=0, 1, and 2 respectively correspond to ISFLG= 3n, 3n+1, and 3n+2 (n=0, 1, 2, . . . ), the image blur compensation modes are set as follows with reference to FIG. 20:

When ISCD=0, the automatic changeover mode;
When ISCD=1, the always ON mode; and
When ISCD=2, the always OFF mode.

In step 225, the above-mentioned code ISCD is checked. If "ISCD=2", the flow jumps to step 229, and image blur compensation is not performed. If "ISCD ≠2", the flow advances to step 226, In step 226, the code ISCD is checked, and if "ISCD=1", the flow jumps to step 228 to transmit an image blur compensation start command to the lens, thus performning image blur compensation. On the other hand, if "ISCD ≠1", i.e., "ISCD=0", the flow advances to step 227.

In step 227, it is checked if there is a possibility of an image blur. In a still camera which uses a film of a 35-mm format, it is normally considered that the hand shake limit speed is 1/(focal length). More specifically, if the following relation is satisfied, there is a possibility of an image blur due to a hand shake:

$$1 < t_{exp} * f$$

where $t_{exp}$ (sec) is the shutter speed, and f (mm) is the focal length. Thus, in step 227, hand shake discrimination is performed using the above relation Note that a constant Co in step 227 is "Co-1" in the above relation, but may assume a different numerical value as needed.

If YES in step 227, a command for starting image blur compensation is transmitted to the lens LNS in step 228. This command serves as a command for starting the operation when the image blur compensation mechanism is inactive, or serves as a command for maintaining the current state when the image blur compensation mechanism is active.

On the other hand, if NO in step 227, the flow jumps to step 229, and an image blur compensation start command is not output. In step 229, an AF in-focus history is checked. If an in-focus state has already been achieved in the one-shot AF mode, the flow jumps to step 232 without executing the AF operation; otherwise, the flow advances to step 230.

In step 230, the focus detection means AFSNS performs focus detection, and calculates a defocus amount and a lens driving amount. In step 231, the lens driving amount is transmitted to the lens microcomputer LCPU, thus issuing a focus driving command.

In step 232, the state of the switch SW2 is detected. If the switch SW2 is OFF, the flow returns to step 209, and steps 221 to 231 are repetitively executed.

If it is determined in step 232 that the switch SW2 is ON, an exposure sequence in step 241 and subsequent steps is executed.

More specifically, in step 241, the camera microcomputer CCPU transmits a stop command for stopping the focusing operation and an aperture down command based on the aperture value calculated in step 223 to the lens microcomputer LCPU. In step 242, a known mirror up mechanism (not shown) is driven to retract a mirror. In step 243, the shutter SH is controlled on the basis of the shutter speed calculated in step 223. In step 244, the camera microcomputer CCPU transmits an aperture return command to the lens microcomputer LCPU. In step 245, a mirror return operation is performed. In step 246, the drive means DR in FIG. 15 is driven to perform a film feed operation and a shutter charge operation.

In step 247, the drive mode is checked. If the drive mode is the single photography mode, the flow returns to step 209. In this state, if the switch SW1 is kept ON, the operations in step 221 and the subsequent steps are executed again. On the other hand, if the drive mode is the continuous photography mode, the flow returns to step 232. In this state, if the switch SW2 is kept ON, the operations in step 241 and subsequent steps are executed to perform continuous photographing operations.

Note that the operation of the lens LNS in the sixth embodiment is the same as that of the lens LNS in the fifth embodiment shown in FIG. 19, and a detailed description thereof will be omitted.

According to the above-mentioned flow, when the locked state of the main switch SWMN is released and a photography mode is selected, the image blur compensation mode is set In the automatic changeover mode. In this mode, an image blur amount during exposure is estimated, and it is checked if the image blur compensation is necessary. Furthermore, when a photographer operates the image blur compensation changeover switch SWIS, the image blur compensation mode can be changed over from the automatic changeover mode to the always ON or OFF modes <Seventh Embodiment>

A hand shake causes an image blur during exposure described in the sixth embodiment, and also disturbs accurate framing. In this case, the discrimination criteria for determining whether or not image blur compensation is necessary include only the hand shake amplitude and the focal length of the photographing lens.

In the seventh embodiment of the present invention to be described below, an image blur amplitude maximum value in a predetermined period of time is detected based on the hand shake amplitude in the predetermined period of time and the focal length of the photographing lens, and an image blur compensation ON/OFF mode is automatically set in correspondence with the detected value. In addition, the mode can be changed by a photographer.

Figure 23B:
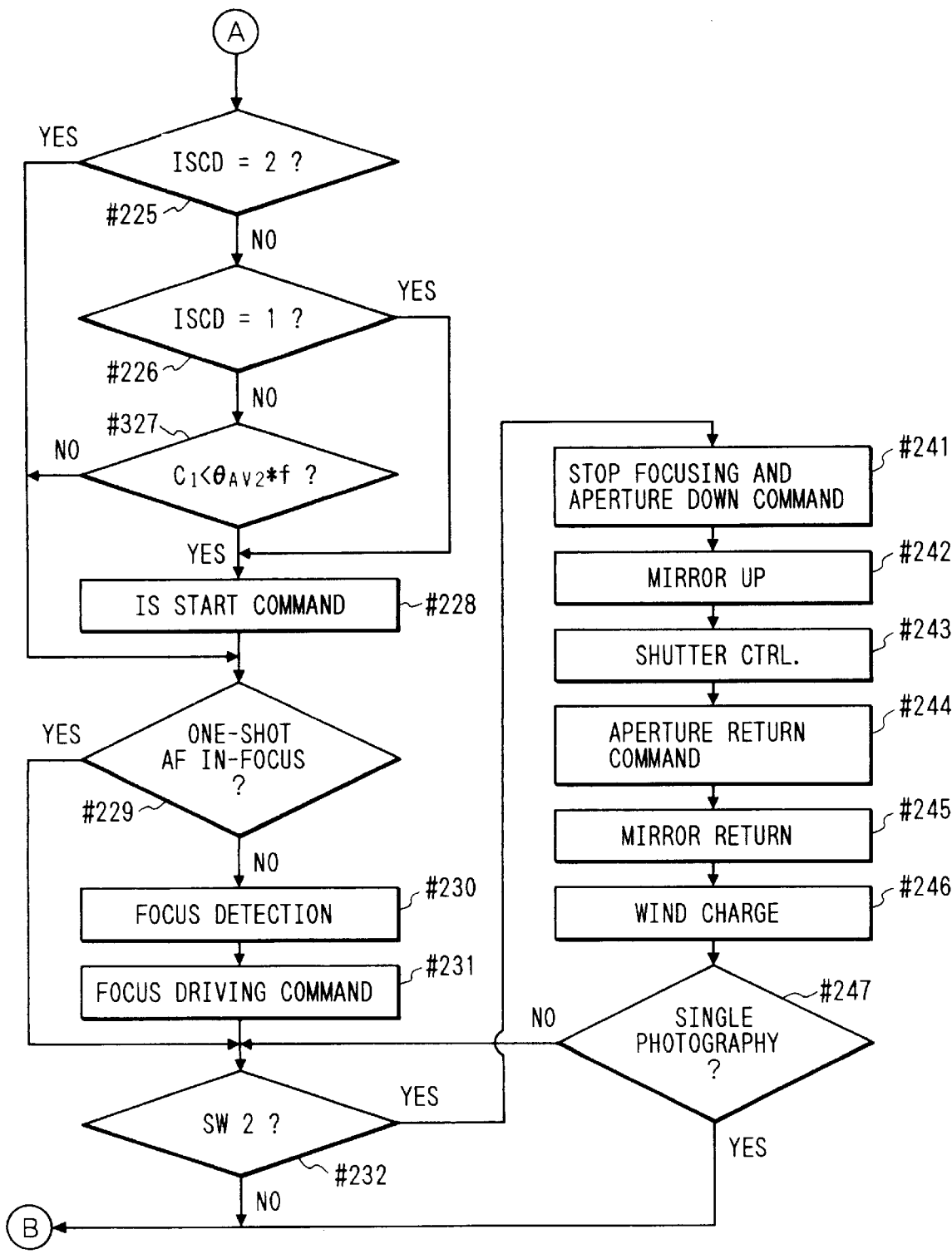
FIG. 23 is comprised of FIGS. 23A and 23B showing flow charts of the operation of a camera microcomputer according to the seventh embodiment of the present invention.

FIGS. 23A and 23B show block diagrams of a camera operation of the camera microcomputer CCPU in the seventh embodiment of the present invention. Since this flow is substantially the same as that (FIGS. 22A and 22B) of the sixth embodiment except that step 323 is inserted between steps 223 and 224 and step 227 is replaced by step 327, the same reference numerals denote the same steps and a repetitive description thereof will be avoided.

If it is determined in step 209 that the switch SW1 is ON, a lens communication, photometry, and exposure calculation are performed in steps 221 to 223.

In step 323, an integrated value $\theta_{AV2}$ of a hand shake displacement $\theta$ is calculated by the following equation:

$$\theta_{AV2} = \sum_{t=-\Delta t}^{o} \theta^2$$

Note that the hand shake displacement $\theta$ is hand shake angular displacement data, which is obtained in such a manner that a hand shake angular velocity signal detected by the hand shake sensor GR in the lens is received via the lens microcomputer LCPU, and the received signal is subjected to a calculation such as an integration. On the other hand, "t=0" represents the current time, and "t=−Δt" represents a time in the past returned from the present by Δt.

Therefore, $\theta_{AV2}$ in the above equation is obtained by integrating squares of the hand shake angular displacements $\theta$ for the time Δt, and represents a time average value of the absolute value of the hand shake angular displacement. More specifically, in this step, the amplitude of a hand shake during the predetermined time Δt is calculated.

In step 224, the image blur compensation code ISCD is calculated. If it is determined in step 225 that "ISCD=2", i.e., the image blur compensation always OFF mode is detected, the flow jumps to step 229.

If it is determined in step 226 that "ISCD=1", i.e., the image blur compensation always ON mode is detected, the flow jumps to step 228.

Step 327 is executed when "ISCD=1", i.e., in the image blur compensation automatic changeover mode. In step 327, it is checked if a product of the hand shake integrated value $\theta_{AV2}$ calculated in step 323 and the focal length f is larger than a predetermined discrimination level $C_1$. If YES in step 327, it is determined that image blur compensation is necessary, and the flow advances to step 228; otherwise, the flow jumps to step 229.

Note that the operation of the lens LNS in the seventh embodiment is the same as that of the lens LNS in the fifth embodiment shown in FIG. 19, and a detailed description thereof will be omitted.

According to the above-mentioned flow, when the locked state of the main switch SWMN is released and a photography mode is selected, the image blur compensation mode is set in the automatic changeover mode. In this mode, whether or not image blur compensation is necessary is discriminated based on a hand shake caused by a photographer and the focal length of the photographing lens. Furthermore, when a photographer operates the image blur compensation changeover switch SWIS, the image blur compensation mode can be changed over from the automatic changeover mode to the always ON or OFF mode.

Note that necessity/unnecessity of image blur compensation in the image blur compensation automatic changeover mode in the seventh embodiment may be determined based on only the focal length of the photographing lens. This is because the amplitude absolute values of hand shakes of men can be assumed to be almost constant although they have slight personal differences.

<Eighth Embodiment>

In the eighth embodiment of the present invention to be described below, the features of the sixth and seventh embodiments are combined, and FIG. 24 shows the operations of the eighth embodiment.

Referring to FIG. 24, when the mode dial DLMOD is set at a position other than L, an initial image blur compensation mode corresponding to each photography mode is set to be a mode described in the rightmost column in FIG. 24. The contents of the image blur compensation modes shown in FIG. 24 are the same as those described in the sixth embodiment. Each time the image blur compensation changeover button BTIS of the camera is depressed, the image blur compensation mode is changed over, as shown in FIG. 24.

Figure 26:
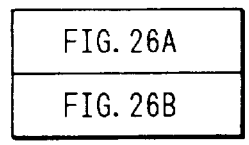
FIG. 26 is comprised of FIGS. 26A and 26B showing flow charts of the operation of a camera microcomputer according to the eighth embodiment of the present invention.
Figure 26A:
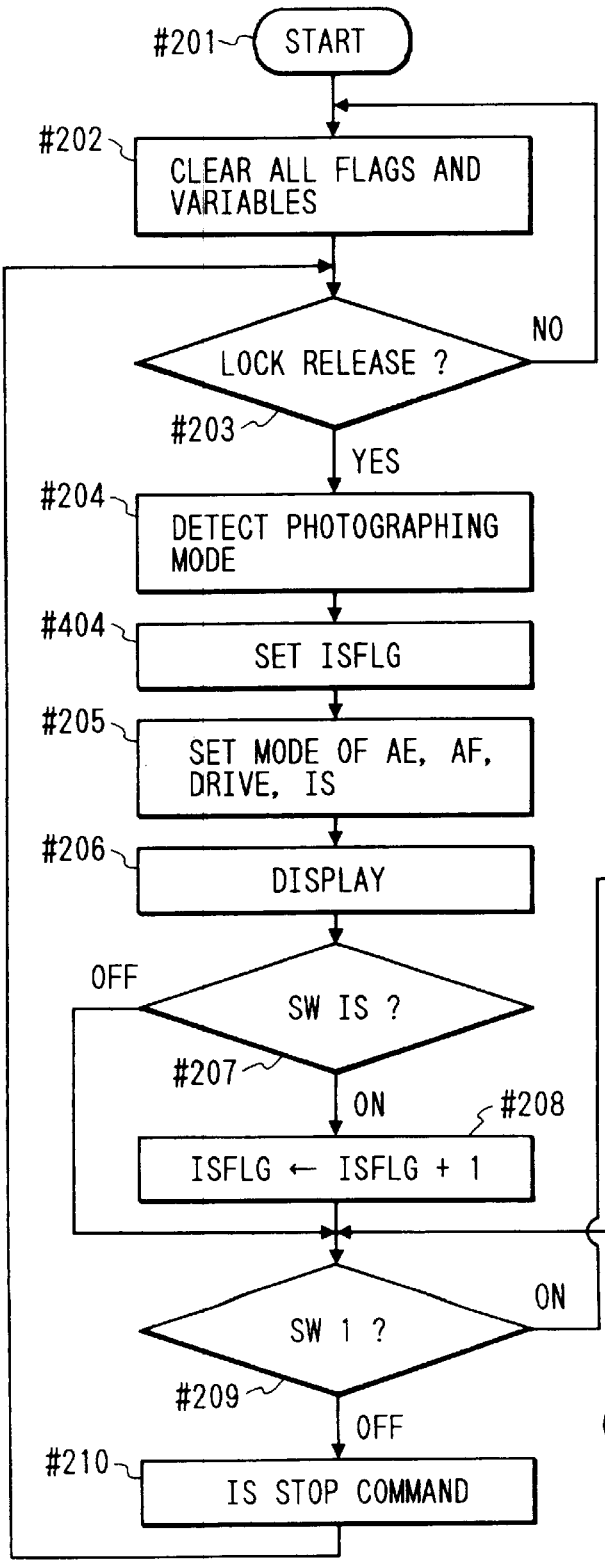
Figure 26B:
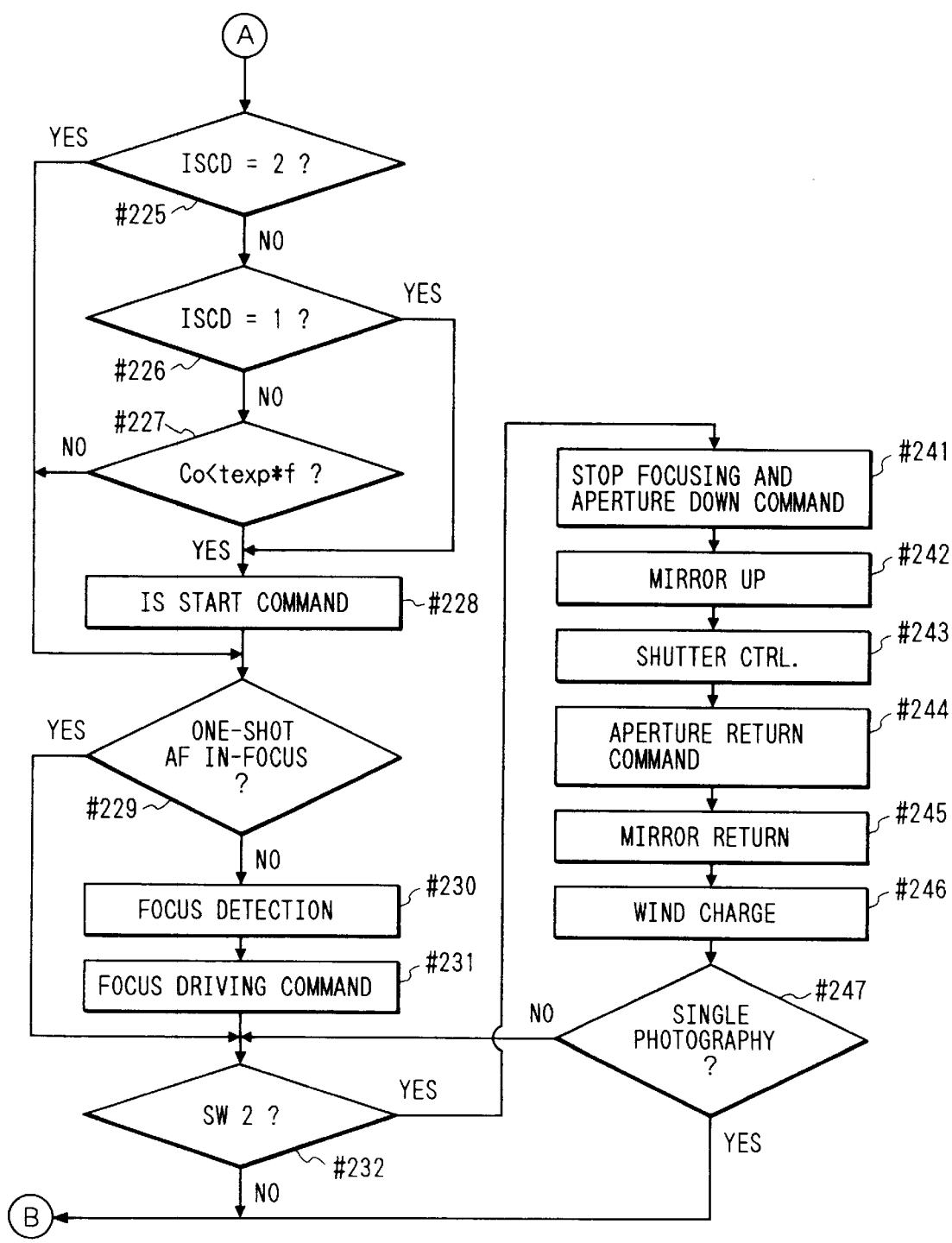

FIGS. 26A and 26 show a flow chart of the operation of the camera microcomputer CCPU in the eighth embodiment of the present invention. This flow is substantially the same as the flow of the sixth embodiment shown in FIGS. 22A and 22B except that step 404 is added between steps 204 and 205.

More specifically, in the sixth embodiment, an initial value of the flag ISFLG for determining the image blur compensation mode is always "0" independently of the photography mode. However, in the eighth embodiment, when the photography mode is detected in step 204, one of predetermined values "0", "1", and "2" is set in the flag ISFLG on the basis of the table shown in FIG. 24 in step 404. In step 205, an image blur compensation mode corresponding to the value set in step 404 is selected. In step 206, the selection result is displayed.

In step 207 and subsequent steps, as in the sixth embodiment, each time the switch SWIS interlocked with the image blur compensation changeover button BTIS is turned on, the value of the flag ISFLG is updated to change over the image blur compensation mode.

As described above, in the eighth embodiment, since image blur compensation modes suitable for photography modes are further finely set, the operability of the camera can be further improved.

Of the fifth to eighth embodiments described above, the sixth and eighth embodiments are those unique to a still camera, but the fifth and seventh embodiments can be applied to a movie camera, as a matter of course, In this case, the main switch SWMN and the mode switch SWMODE for selecting a photography mode in FIG. 15 have the same functions as those of the still camera, the switch SW1 can be replaced by a standby switch for starting an image display on an electronic view finder, and the switch SW2 can be replaced by a recording start switch.

In each of the above embodiments of the present invention, an image blur compensation method is an optical method attained by displacing a portion of an imaging optical system. However, the present invention can be applied to a method of performing image blur compensation by image signal processing of an image sensor.

According to each of the above embodiments, the camera automatically determines an optimal image blur compensation mode in correspondence with a photographing condition, and when the determined image blur compensation mode is to be changed, the mode can be changed in response to an operation of the image blur compensation mode changeover switch SWIS by a photographer. In a normal photographing operation, a photographer need not perform a troublesome setting operation of the image blur compensation mode, and can change the mode in correspondence with a his or her will, thus providing an image blur compensation apparatus with good operability.

As described above, according to the fifth to eighth embodiments of the present invention, a camera comprises image blur compensation mode setting means for determining an active or inactive state of an image blur compensation means in accordance with a photographing condition which is set by photographing condition setting means for setting a photographing condition used upon recording of an object image on a film or an image pickup element, and image blur mode changing means for changing the image blur compensation mode set by the image blur compensation mode setting means, wherein the camera automatically determines an optimal image blur compensation mode for the set photographing condition, and a photographer can change the image blur compensation mode as needed.

Therefore, a photographer need not perform a troublesome setting operation of the image blur compensation mode, and can change the mode in correspondence with a his or her will.

Part or all of the arrangement of the embodiment or claim may be arranged in another or separate apparatuses. For example, a blur detection apparatus may be arranged in a camera main body, a blur correction apparatus in a lens barrel to be attached to the camera, and a controller for controlling these apparatuses in an intermediate adapter.

The blur prevention means is not limited to one for directly preventing a blur, but may be one for generating an alarm message indicating the fact or possibility of a blur by means of light, sound, or the like to a user, and indirectly preventing a blur.

The blur detection means may comprise any of an angular accelerometer, an accelerometer, an angular velocimeter, a velocimeter, an angular displacement meter, a displacement meter, and a method of detecting a blur itself of an image as long as a blur can be detected.

In addition to a shift optical system for moving an optical member in a plane perpendicular to the optical axis, the blur prevention means may comprise any of light beam deflection means such as a variable apical angle prism, means for moving a photographing plane, means for correcting a blur by image processing, and the like as long as a blur can be prevented.

The present invention can be applied to a lens-shutter camera, a video camera, an optical equipment other than a camera, and other devices in addition to the single-lens reflex camera. When the present invention is applied to a video camera, the operation during exposure of the camera in each of the above embodiments is performed during an image recording operation of the video camera.

The above embodiments or their technical components may be combined as needed.

The individual components shown in schematic or block form in the Drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image blur prevention apparatus for use in preventing image blur in a photography apparatus, said image blur prevention apparatus having (i) an operation state in which a predetermined image blur prevention operation is performed in accordance with an output of a vibration detection sensor, and (ii) an inoperation state in which the predetermined image blur prevention operation is not performed, the photography apparatus having an optical system and a shutter, said apparatus comprising:

determination means for determining whether the image blur prevention apparatus should perform the predetermined image blur prevention operation in accordance with at least one of (i) an output of the vibration detection sensor, (ii) a focal length of the optical system, and (iii) a shutter speed of the photography apparatus;

operation start control means which starts the predetermined image blur prevention operation of the image blur prevention apparatus in accordance with a predetermined operation of an operation portion when a judgment of said determination means determines the operation state in which the predetermined image blur prevention operation of the image blur prevention apparatus is to be carried out, but does not start the predetermined image blur prevention operation of the image blur prevention apparatus regardless of the predetermined operation of the operation portion when the judgement of said determination means determines the operation state in which the image blur prevention operation of the image blur prevention apparatus is not to be carried out; and control means which, when the photography apparatus is in an image recording operation state, and when the image blur prevention apparatus is carrying out the predetermined image blur prevention operation, and when a judgement of said determination means is changed over from an operation state to a non-operation state of the image blur prevention apparatus, prohibits the transition of the operation state of the image blur prevention apparatus in accordance with the changeover of the judgement of said determination means, and holds the operation state of the image blur prevention apparatus at least until an image recording operation of the photography apparatus is completed.

2. Apparatus according to claim 1, wherein said operation start control means controls the start of the operation of the image blur prevention apparatus in accordance with the predetermined operation of the operation portion for starting the image recording operation.

3. A camera having an image blur prevention device for preventing image blur in a photography operation and operating in accordance with an output of a vibration detection sensor which detects a vibration state of the camera, an optical system, and a shutter, said camera comprising:

determination means for determining whether the image blur prevention device should perform an image blur prevention operation in accordance with at least one of (i) an output of the vibration detection sensor, (ii) a focal length of the camera optical system, and (iii) a shutter speed of the camera;

operation start control means which starts the image blur prevention operation of the image blur prevention device in accordance with a predetermined operation of an operation portion when a judgment of said determination means determines the operation state in which the image blur prevention operation of the image blur prevention apparatus is to be carried out, but does not start the image blur prevention operation of the image blur prevention apparatus regardless of the predetermined operation of the operation portion when the judgement of said determination means determines the operation state in which the image blur prevention operation of the image blur prevention apparatus is not to be carried out; and control means which, when the camera is in an image recording operation state, and when the image blur prevention device is carrying out the image blur prevention operation, and when a judgement of the determination means is changed over from an operation state to a non-operation state of the image blur prevention device, prohibits the transition of the operation state of the image blur prevention device in accordance with the changeover of the judgement of said determination means, and holds the operation state of the image blur prevention apparatus at least until an image recording operation of the camera is completed.

4. Apparatus according to claim 3, wherein said operation start control means controls the start of the operation of the image blur prevention apparatus in accordance with the predetermined operation of the operation portion for starting the image recording operation.

5. An apparatus adapted for use with a camera image blur correction device which corrects an image blur in accordance with an output of a vibration sensor which detects a vibration state of the apparatus, the camera having an optical system and a shutter, said apparatus comprising:

determination means which determines whether the image blur correction device should perform an image blur prevention operation in accordance with at least one of (i) an output of the vibration detection sensor, (ii) a focal length of the camera optical system, and (iii) a shutter speed of the camera;

operation state control means which starts the image blur prevention operation of said image blur correction device in accordance with a predetermined operation of an operation portion when a judgment of said determination means determines the operation state in which the image blur prevention operation of the image blur prevention apparatus is to be carried out, but does not start the image blur prevention operation of the image blur prevention apparatus regardless of the predetermined operation of the operation portion when the judgement of said determination means determines the operation state in which the image blur prevention operation of the image blur prevention apparatus is not to be carried out; and a control device which, when the camera is in an image recording operation state, and when the image blur correction device is carrying out the image blur prevention operation, and when a judgement of said determination means is changed over from an operation state to a non-operation state of the image blur correction device, prohibits the transition of the operation state of the image blur correction device in accordance with the changeover of the judgement of said determination means, and holds the operation state of the image blur prevention apparatus at least until an image recording operation of the camera is completed.

6. Apparatus according to claim 5, wherein said operation start control means controls the start of the operation of the image blur prevention apparatus in accordance with the predetermined operation of the operation portion for starting the image recording operation.

7. Apparatus according to claim 5, further comprising changing means for changing the state of the image blur prevention device in accordance with an image recording condition, and wherein said control device includes means for preventing, during an image recording operation, abrupt image blur by preventing said changing means from changing said state.

8. Apparatus according to claim 7, wherein said control device includes means for preventing, during the image recording operation, the abrupt image blur by preventing said changing means from changing said state in accordance with an image recording time.

9. Apparatus according to claim 7, wherein said changing means comprises means for in activating the image blur prevention device when the image recording time is shorter than a predetermined time.

10. Apparatus according to claim 5, further comprising changing means for changing the state of the image blur prevention device in accordance with a focal length, and wherein said operation means includes means for preventing, during an image recording operation, abrupt image blur by preventing said changing means from changing said state.

11. Apparatus according to claim 10, wherein said control device includes means for preventing, during the image recording operation, the abrupt image blur by inactivating the image blur prevention device when the focal length is shorter than a predetermined value.

12. Apparatus according to claim 5, wherein the image blur prevention device includes a movable portion, and wherein said control device includes means for preventing, during an image recording operation, abrupt image blur until the movable portion moves to within a predetermined movable range.

13. An image blur prevention apparatus for use in preventing image blur in a photography apparatus, said image blur prevention apparatus having an operation state in which a predetermined image blur prevention operation is performed in accordance with an output of a vibration detection sensor, and having an operation state in which the predetermined image blur prevention operation is not performed, the photography apparatus having an optical system and a shutter, said apparatus comprising:

determination means for determining whether the image blur prevention apparatus should perform the predetermined image blur prevention operation in accordance with at least one of (i) an output of the vibration detection sensor, (ii) a focal length of the optical system, and (iii) a shutter speed of the photography apparatus;

operation start control means which starts the predetermined image blur prevention operation of the image blur prevention apparatus in accordance with a predetermined operation of an operation portion when a judgment of said determination means determines the operation state in which the predetermined image blur prevention operation of the image blur prevention apparatus is to be carried out, but does not start the predetermined image blur prevention operation of the image blur prevention apparatus regardless of the predetermined operation of the operation portion when the judgment of said determination means determines the operation state in which he predetermined image blur prevention operation of the image blur prevention apparatus is not to be carried out; and operation state transition control means which, when the judgment of said determination means is changed over upon performing the predetermined operation of the operation portion, changes over from one state to the other state among states in which the predetermined image blur prevention operation is performed and the predetermined image blur prevention operation is not performed, when the photography apparatus is not in an image recording operation, and changes over the operation state of the image blur prevention apparatus in accordance with a change of the judgment of said determination means, but, when the photography apparatus is in the image recording operation, does not change over the operation state of the image blur prevention apparatus regardless of the change of the judgment of said determination means, and holds the operation state of the image blur prevention apparatus at least until the image recording operation of the photography apparatus is completed.

14. An image blur prevention apparatus for use in preventing image blur in a photography apparatus, said image blur prevention apparatus having a state in which a predetermined image blur prevention operation is performed in accordance with an output of a vibration detection sensor, said apparatus comprising:

operation start control means which starts the predetermined image blur prevention operation of the image blur prevention apparatus in accordance with a predetermined operation of an operation portion;

stop command signal generation means which generates a stop command signal for stopping the predetermined image blur prevention operation; and stop control means which, when the photography apparatus is not in an image recording operation state, stops the predetermined image blur prevention operation in accordance with a generation of the stop command signal by said to stop command a signal generation means, but when the photography apparatus is in the image recording operation state, does not receive the stop command signal regardless of the generation of the stop command signal so as not to stop the predetermined image blur prevention operation and so as to continue the predetermined image blur prevention operation until at least the image recording operation of the photography apparatus is completed.

* * * * *

UNITED STATES PATENT AND TRADEMARK OFFICE
CERTIFICATE OF CORRECTION

PATENT NO. : 6,091,448

DATED : July 18, 2000

INVENTOR(S): KOICHI WASHISU, ET AL.

It is certified that error appears in the above-identified patent and that said Letters Patent is hereby corrected as shown below:

COVER PAGE AT ITEM [73] ASSIGNEE:
"Canon Kabushiki Kaisha, Japan" should read --Canon Kabushiki Kaisha, Tokyo, Japan--.

COLUMN 1:
Line 29, "objects" should read --object,--; and
Line 50, "apparatus" should read --apparatus.--.

COLUMN 2:
Line 14, "Camera" should read --camera--.

COLUMN 3:
Line 37, "FIG. 5B" should read --FIG. 5B;--; and
Line 61, "is" should be deleted.

COLUMN 6:"
Line 9, "yokes" should read --yokes.--; and
Line 11, "712p$_1$," should read --712p$_1$--.

COLUMN 7:
Line 46, "Outputs" should read --outputs--.

COLUMN 10:
Line 12, "1and" should read --1 and--; and
Line 48, "he" should read --be--.

UNITED STATES PATENT AND TRADEMARK OFFICE
CERTIFICATE OF CORRECTION

PATENT NO. : 6,091,448

DATED : July 18, 2000

INVENTOR(S): KOICHI WASHISU, ET AL.

It is certified that error appears in the above-identified patent and that said Letters Patent is hereby corrected as shown below:

COLUMN 11:
Line 14, "an is" should read --an--.

COLUMN 13:
Line 49, "and" should read --an--.

COLUMN 14:
Line 16, "hy" should read --by--; and
Line 62, "1s" should read --is--.

COLUMN 19:
Line 39, "State" should read --state--.

COLUMN 20:
Line 33, "repetitively." should read --repetitively--.

COLUMN 21:
Line 55, "is" should be deleted.

COLUMN 23:
Line 31, "Is" should read --is--.

COLUMN 24:
Line 54, "In" should read --in--.

UNITED STATES PATENT AND TRADEMARK OFFICE
CERTIFICATE OF CORRECTION

PATENT NO. : 6,091,448
DATED       : July 18, 2000
INVENTOR(S): KOICHI WASHISU, ET AL.

Page 3 of 3

It is certified that error appears in the above-identified patent and that said Letters Patent is hereby corrected as shown below:

COLUMN 26:
Line 53, "course," should read --course.--.

COLUMN 30:
Line 23, "in activating" should read --inactivating--.

COLUMN 31:
Line 6, "he" should read --the--.

Signed and Sealed this

First Day of May, 2001

Attest:

NICHOLAS P. GODICI

*Attesting Officer*   *Acting Director of the United States Patent and Trademark Office*